US009876850B2

United States Patent
Benson et al.

(10) Patent No.: US 9,876,850 B2
(45) Date of Patent: Jan. 23, 2018

(54) GATEWAY-FACILITATED COMMUNICATIONS FOR RESOURCE-CONSTRAINED DEVICES

(71) Applicant: Exosite LLC, Minneapolis, MN (US)

(72) Inventors: Mark Dennis Benson, Plymouth, MN (US); Hans Aaron Rempel, Minneapolis, MN (US)

(73) Assignee: Exosite LLC, Minneapolis, MN (US)

( * ) Notice: Subject to any disclaimer, the term of this patent is extended or adjusted under 35 U.S.C. 154(b) by 152 days.

(21) Appl. No.: 14/734,529

(22) Filed: Jun. 9, 2015

(65) Prior Publication Data

US 2015/0358395 A1  Dec. 10, 2015

Related U.S. Application Data

(60) Provisional application No. 62/009,444, filed on Jun. 9, 2014.

(51) Int. Cl.
*G06F 13/00* (2006.01)
*H04L 29/08* (2006.01)
*H04W 88/16* (2009.01)

(52) U.S. Cl.
CPC ............ *H04L 67/10* (2013.01); *H04L 67/125* (2013.01); *H04L 67/32* (2013.01); *H04W 88/16* (2013.01)

(58) Field of Classification Search
CPC ....... H04L 67/125; H04L 67/10; H04L 67/32; H04W 88/16

(Continued)

(56) References Cited

U.S. PATENT DOCUMENTS 6,745,259 B2 * 6/2004 Wagner ............... G06F 8/33
370/401
2002/0032810 A1 * 3/2002 Wagner ............... G06F 8/33
710/33

(Continued)

FOREIGN PATENT DOCUMENTS

WO  2010077851 A2  7/2010
WO  2011025358 A1  3/2011

OTHER PUBLICATIONS

PCT International Searching Authority, The International Search Report and Written Opinion for application No. PCT/US2015/034934 dated Oct. 7, 2015, 16 pages.

*Primary Examiner* — Kenneth R Coulter
(74) *Attorney, Agent, or Firm* — Merchant & Gould P.C.

(57) ABSTRACT

A network-connected object for performing a function and communicating with a server computing device via a network includes a functional object, application-specific input/output (I/O) device, and a gateway device. The functional object is configured to perform a function. The application-specific I/O device includes an electronic circuit configured to perform an application-specific function related to the functional object. The gateway device includes a first communication device configured for data communication with the application-specific I/O device, a second communication device configured for data communication with the server computing device, at least one processing device, and at least one computer readable storage device. The gateway device is configured to receive a command and a profile identifier from the application-specific I/O device, determine a client identification key associated with the profile identifier, and transmit the command with the client identification key to the server computing device.

18 Claims, 20 Drawing Sheets

(58) Field of Classification Search
USPC .......................................... 709/220, 221, 222
See application file for complete search history.

(56) References Cited

U.S. PATENT DOCUMENTS

| | | |
|---|---|---|
| 2007/0067385 A1 | 3/2007 | D'Angelo et al. |
| 2007/0210916 A1 | 9/2007 | Ogushi et al. |
| 2014/0136623 A1 | 5/2014 | Kvache et al. |

* cited by examiner

GATEWAY-FACILITATED COMMUNICATIONS FOR RESOURCE-CONSTRAINED DEVICES

CROSS REFERENCE TO RELATED APPLICATION

This application claims priority to U.S. Application Ser. No. 62/009,444, filed on Jun. 9, 2014, entitled GATEWAY-FACILITATED COMMUNICATIONS FOR RESOURCE-CONSTRAINED DEVICES, the disclosure of which is hereby incorporated by reference in its entirety.

BACKGROUND

Remote observation and management of everyday objects is becoming quite common. These objects may connect to a server on the Internet to record status information or measurements that relate to the object. Additionally, the objects can receive information, instructions, and new software from the server as well. For example, using this capability, a manufacturer may deploy a firmware upgrade for some of the objects without requiring any user interaction with the object by its owner.

Generally, these network-enabled objects generate machine-to-machine communication. That is, one machine, the object, communicates with another machine, the server. However, this machine-to-machine communication is only possible when the object and the server are able to connect to one another through a network.

It may be expensive and complicated to provide custom-designed network access capabilities in each device or object.

SUMMARY

In general terms, this disclosure is directed to using a gateway device to facilitate communication for network-connected objects and maintaining profiles for network-connected objects. In one possible configuration and by non-limiting example, the network-connected object includes a plurality of component devices, including a gateway device, and profiles are maintained for the component devices. Various aspects are described in this disclosure, which include, but are not limited to, the following aspects.

In a first aspect, a network-connected object for performing a function and communicating with a server computing device via a network, the network-connected object comprising: a functional object, the functional object being configured to perform a function; an application-specific input/output (I/O) device, comprising: an electronic circuit configured to perform an application-specific function related to the functional object; and a gateway device, comprising: a first communication device configured for data communication with the application-specific I/O device; a second communication device configured for data communication with the server computing device; at least one processing device that is configured to control the gateway device; and at least one computer readable data storage device storing instructions that, when executed by the at least one processing device, cause the gateway device to: receive using the first communication device an activation command from the application-specific I/O device, the activation command including a device identifier; transmit using the second communication device the activation command to the server computing device; receive using the second communication device a response to the activation command from the server computing device; and transmit using the first communication device the profile identifier to the application-specific I/O device.

In another aspect, a method for activating an application-specific input/output (I/O) device of a network-connected object on a server computing device using a gateway device of the network-connected object, the method comprising: receiving using a first communication device of the gateway device an activation command from an application-specific I/O device, the activation command including a device identifier; transmitting using a second communication device of the gateway device the activation command to the server computing device; receiving using the second communication device of the gateway device a response to the activation command from the server computing device, the response including a client identification key for the application-specific I/O device; storing the client identification key; storing an association between the client identification key and a profile identifier; and transmitting using the first communication device of the gateway device the profile identifier to the application-specific I/O device.

In yet another aspect, a network-connected object for performing a function and communicating with a server computing device via a network, the network-connected object comprising: a functional object, the functional object being configured to perform a function; a gateway device, comprising: an electronic circuit configured to communicate with a server computing device; an application-specific input/output (I/O) device, comprising: an electronic circuit configured to perform an application-specific function related to the functional object; a communication device configured for data communication with the gateway device; at least one processing device that is configured to control the application-specific I/O device; and at least one computer readable data storage device storing instructions that, when executed by the at least one processing device, cause the application-specific I/O device to: transmit using the communication device an activation command to the gateway device, the activation command including a device identifier; and receive using the communication device a response to the activation command from the gateway device, the response including a profile identifier and a client identification key, the client identification key being assigned by the server computing device in response to the activation command.

In another aspect, a method for activating an application-specific input/output (I/O) device of a network-connected object on a server computing device using a gateway device of the network-connected object, the method comprising: transmitting using a communication device of the application-specific I/O device an activation command to the gateway device, the activation command including a device identifier; and receiving using the communication device of the application-specific I/O device a response to the activation command from the gateway device, the response including a profile identifier and a client identification key, the client identification key being assigned by the server computing device in response to the activation command.

In yet another embodiment, a network-connected object for performing a function and communicating with a server computing device via a network, the network-connected object comprising: a functional object, the functional object being configured to perform a function; an application-specific input/output (I/O) device, comprising: an electronic circuit configured to perform an application-specific function related to the functional object; and a gateway device, comprising: a first communication device configured for data communication with the application-specific I/O device; a second communication device configured for data communication with the server computing device; at least one processing device that is configured to control the gateway device; and at least one computer readable data storage device storing instructions that, when executed by the at least one processing device, cause the gateway device to: receive using the first communication device an add profile command from the application-specific I/O device, the activation command including a client identification key, the client identification key having been previously assigned by the server computing device; store the client identification key; store an association between the client identification key and a profile identifier; and transmit using the first communication device the profile identifier to the application-specific I/O device.

In another aspect, a method for adding a profile for an application-specific input/output (I/O) device of a network-connected object to a gateway device of the network-connected object, the method comprising: receiving using a communication device of the gateway device an add profile command from the application-specific I/O device, the activation command including a client identification key, the client identification key having been previously assigned by a server computing device; storing the client identification key; storing an association between the client identification key and a profile identifier; and transmitting using the communication device the profile identifier to the application-specific I/O device.

In yet another aspect, a network-connected object for performing a function and communicating with a server computing device via a network, the network-connected object comprising: a functional object, the functional object being configured to perform a function; an application-specific input/output (I/O) device, comprising: an electronic circuit configured to perform an application-specific function related to the functional object; and a gateway device, comprising: a first communication device configured for data communication with the application-specific I/O device; a second communication device configured for data communication with the server computing device; at least one processing device that is configured to control the gateway device; and at least one computer readable data storage device storing instructions that, when executed by the at least one processing device, cause the gateway device to: receive using the first communication device a first publish command from the application-specific I/O device, the first publish command including a profile identifier and data related to the functional object; determine a client identification key associated with the profile identifier; and transmit using the second communication device the second publish command to the server computing device, the second publish command including the client identification key and the data related to the functional object.

In another aspect, a method for publishing from an application-specific input/output (I/O) device of the network-connected object to a server computing device using a gateway device of the network-connected object, the method comprising: receiving using a first communication device of the gateway device a first publish command from the application-specific I/O device, the first publish command including a profile identifier and data related to a functional object of the network-connected object; determining a client identification key associated with the profile identifier; and transmitting using a second communication device of the gateway device the second publish command to the server computing device, the second publish command including the client identification key and the data related to the functional object.

In yet another aspect, a network-connected object for performing a function and communicating with a server computing device via a network, the network-connected object comprising: a functional object, the functional object being configured to perform a function; an application-specific input/output (I/O) device, comprising: an electronic circuit configured to perform an application-specific function related to the functional object; and a gateway device, comprising: a first communication device configured for data communication with the application-specific I/O device; a second communication device configured for data communication with the server computing device; at least one processing device that is configured to control the gateway device; and at least one computer readable data storage device storing instructions that, when executed by the at least one processing device, cause the gateway device to: receive using the first communication device a first list content command from the application-specific I/O device, the first list content command including a profile identifier; determine a client identification key associated with the profile identifier; transmit using the second communication device a second list content command to the server computing device, the second list content command including the client identification key; receive using the second communication device a response to the second list content command from the server computing device, the response including data representing at least one file available on the server computing device; and transmit using the first communication device the data to the application-specific I/O device.

In another aspect, a method for receiving a list of content available on a server computing device by an application-specific input/output (I/O) device of the network-connected object using a gateway device of the network-connected object, the method comprising: receiving using a first communication device of the gateway device a first list content command from the application-specific I/O device, the first list content command including a profile identifier; determining a client identification key associated with the profile identifier; transmitting using a second communication device of the gateway device a second list content command to the server computing device, the second list content command including the client identification key; receiving using the second communication device of the gateway device a response to the second list content command from the server computing device, the response including data representing at least one file available on the server computing device; and transmitting using the first communication device of the gateway device the data representing at least one file to the application-specific I/O device.

In yet another aspect, a network-connected object for performing a function and communicating with a server computing device via a network, the network-connected object comprising: a functional object, the functional object being configured to perform a function; an application-specific input/output (I/O) device, comprising: an electronic circuit configured to perform an application-specific function related to the functional object; and a gateway device, comprising: a first communication device configured for data communication with the application-specific I/O device; a second communication device configured for data communication with the server computing device; at least one processing device that is configured to control the gateway device; and at least one computer readable data storage device storing instructions that, when executed by the at least one processing device, cause the gateway device to: receive using the first communication device a first command from the application-specific I/O device, the first command including a profile identifier; determine a client identification key associated with the profile identifier; transmit using the second communication device a second command to the server computing device, the second command including the client identification key; receive using the second communication device a response to the second command from the server computing device; and transmit using the first communication device the response and the profile identifier.

In another aspect, a method for processing a command for a server computing device from an application-specific input/output (I/O) device of a network-connected object using a gateway device of the network-connected object, the method comprising: receiving using a first communication device of the gateway device a first command from the application-specific I/O device, the first command including a profile identifier; determining a client identification key associated with the profile identifier; transmitting using a second communication device of the gateway device a second command to the server computing device, the second command including the client identification key; receiving using the second communication device of the gateway device a response to the second command from the server computing device; and transmitting using the first communication device of the gateway device the response and the profile identifier.

In yet another aspect, a gateway device of a network-connected object for performing a function and communicating with a server computing device via a network, the gateway device comprising: at least one computer readable data storage device storing: profile identifier data to identify at least one component device of the network-connected object, the profile identifier data including a unique numerical value for each component device, the numerical value being assigned by the gateway device; client identification key data to identify at least one component device of the network-connected object, the client identification key data including a character string for each component device, the character string being assigned by the server computing device; and association data to associate at least one of the unique numerical values of the profile identifier data with at least one of the character strings of the client identification key data.

In another aspect, a system for communicating with a server computing device via a network, the system comprising: a first network-connected object and a second network-connected object; the first network-connected object comprising: a first functional object, the first functional object being configured to perform a function; an application-specific input/output (I/O) device, comprising: an electronic circuit configured to perform an application-specific function related to the functional object; and a first local communication device, comprising: a first communication device configured for data communication with the application-specific I/O device; a second communication device configured for data communication with the second network-connected object; at least one processing device that is configured to control the first local communication device; and at least one computer readable data storage device storing instructions that, when executed by the at least one processing device, cause the first local communication device to: receive using the first communication device an activation command from the application-specific I/O device, the activation command including a device identifier; transmit using the second communication device the activation command to the second network-connected object; receive using the second communication device a profile identifier for the application-specific I/O device; and transmit using the first communication device the profile identifier; and the second network-connected object comprising: a second local communication device and a gateway device; the second local communication device, comprising: a third communication device configured for data communication with the first network-connected object; a fourth communication device configured for data communication with the gateway device; and at least one processing device that is configured to control the second local communication device; and at least one computer readable data storage device storing instructions that, when executed by the at least one processing device, cause the second local communication device to: receive using the third communication device the activation command; transmit using the fourth communication device the activation command; receive using the fourth communication device a profile identifier for the application-specific I/O device; and transmit using the third communication device the profile identifier; and the gateway device comprising: a fifth communication device configured for data communication with the local communication device; a sixth communication device configured for data communication with the server computing device; a central processing unit that is configured to control the gateway device; and at least one processing device that is configured to control the gateway device; and at least one computer readable data storage device storing instructions that, when executed by the at least one processing device, cause the gateway device to: receive using the fifth communication device the activation command; transmit using the sixth communication device the activation command to the server computing device; receive using the second communication device a response to the activation command from the server computing device, the response including a client identification key for the application-specific I/O device; store the client identification key; store an association between the client identification key and a profile identifier; and transmit using the fifth communication device the profile identifier.

DETAILED DESCRIPTION

Figure 1:
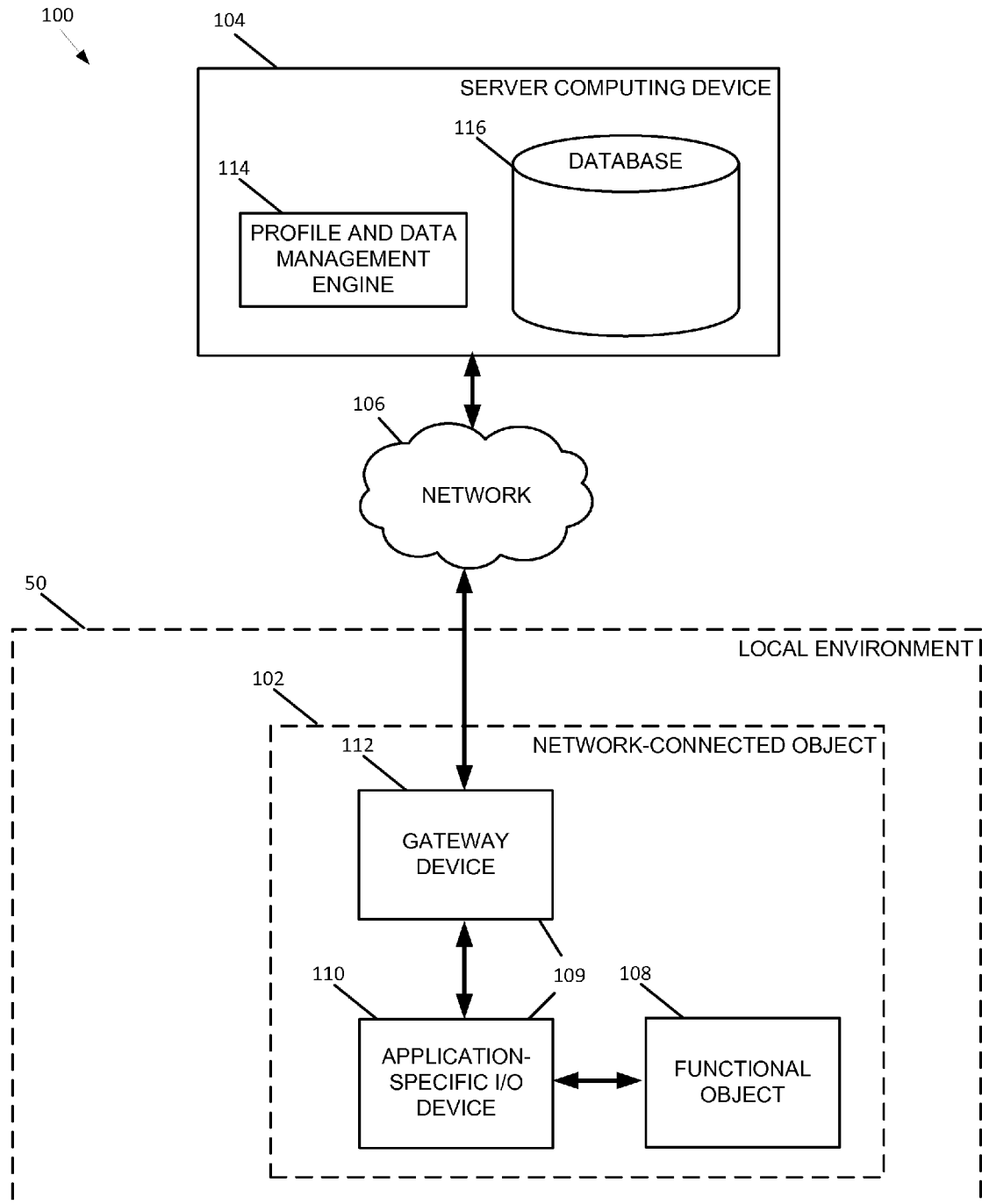
FIG. 1 illustrates an exemplary embodiment of a system for managing network profiles for a network-connected object.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the present disclosure describes systems and methods for generating and using network profiles for a network-connected object. In at least some embodiments, the network-connected object provides network-based monitoring or control capabilities. For example, a network-connected object can be an appliance, such as a water heater, furnace, or garage door, that can be monitored or controlled from a network-based computing device. As another example, a network-connected object can monitor and control a light or another electronic device that is connected to a power outlet. There are many other embodiments of network-connected object as well. A smart object is an example of a network-connected object.

In at least some embodiments, the network-connected object transmits measurements or status information and other data to a server computing device through a network. Additionally, in at least some embodiments, a network-connected object receives commands, instructions, or data from the server computing device through the network. For example, the server computing device can be a cloud-based server that the network-connected object connects to over the Internet. Alternatively, the network-connected object connects to a different type of server computing device over a different network.

In at least some embodiments, the network-connected objects is formed from a functional object and a plurality of component devices. For example, a network-connected object can include some or all of the following component devices: an application-specific input/output (I/O) device, a gateway device, a battery device, and a local communication device. In some embodiments, the gateway device, battery device, and local communication device can all be standard components that are used in many different embodiments of the network-connected objects. A potential benefit of using standard components is that the standard components can be less expensive than custom components.

In at least some embodiments, the component devices of a network-connected object communicate with each other using an internal communication technology, such as Universal Asynchronous Receiver/Transmitter (UART), Inter-Integrated Circuit (I2C), or Serial Peripheral Interface (SPI) bus communication technology. In at least some embodiments, the internal communication technology is simple and inexpensive to implement on the component devices.

In at least some embodiments, the server computing device maintains a profile for some or all of the component devices. Some or all of the component devices of the network-connected object communicate with the server computing device to receive and transmit data and commands. In at least some of embodiments, not all of the component devices can communicate directly with the server computing device. Instead, the component devices communicate with the gateway device using the internal communication technology. The gateway device can then communicate with the server computing device on behalf of the component devices using a wired or wireless communication technology. In at least some embodiments, the server computing device maintains profiles for some or all of the component devices.

In at least some embodiments, the component devices transmit commands structure according to a defined command structure over the internal communication technology to the gateway device. The gateway device processes the commands using information from the component device profile and dispatches the commands to the server computing device. The gateway device also receives responses from the server computing device, processes the responses using information from the component device profile, and dispatches the response to the appropriate component device.

FIG. 1 illustrates an exemplary embodiment of a system 100 for managing profiles and data for a network-connected object 102. The system 100 includes a network-connected object 102, a server computing device 104, and a network 106. Also shown is a local environment 50.

The local environment 50 is the environment where the network-connected object is used. The local environment 50 can be any type of environment. Examples of the local environment 50 include residential, commercial, industrial, natural, healthcare, and military environments. Other examples of local environment 50 are possible as well.

The network-connected object 102 is a device that performs a function and transmits information to or receives information from the server computing device 104 through the network 106. For example, in at least some embodiments, the network-connected object 102 transmits measurements or status information to the server computing device 104 and receives instructions from the server computing device 104. In at least some other embodiments, the network-connected object 102 is used in a different environment.

In at least some embodiments, the network-connected object 102 includes a functional object 108, an application-specific I/O device 110, and a gateway device 112. The application-specific I/O device 110 and gateway device 112 are examples of component device 109 and are referred to collectively as component devices 109. Some embodiments of the functional object 108 include additional component devices 109, such as battery devices, local communication devices, or multiple application-specific I/O devices. In at least some embodiments, at least one of the component devices 109 is a resource-constrained device that has limited capabilities (e.g., computation, memory, I/O, power consumption, etc.). For example, some resource-constrained devices do not have enough memory to perform Internet Protocol (IP) communication. Other examples of resource-constrained devices are possible as well.

The functional object 108 is a physical object that performs a function in the local environment 50. Examples of the functional object 108 include solar panels that perform the function of collecting and storing solar energy, elevators that perform the function of transporting people and objects, and ovens that perform the function of heating food. Additional examples of functional object 108 include water heaters, furnaces, electrical outlets, garage doors, trash compactors, refrigerators, air conditioners, animal traps, and medical devices. These are just a few examples of embodiments of the functional object 108; there are countless other examples of the functional object 108.

The application-specific I/O device 110 is device that is configured to interact with the functional object 108. The application-specific I/O device 110 interacts with the functional object by performing one or both of monitoring and controlling the functional object 108. Various embodiments of the application-specific I/O device 110 are configured to interact with specific embodiments of the functional object 108. For example, an embodiment of the application-specific I/O device 110 may be configured to interact with an embodiment of the functional object 108 that is an oven by measuring the current temperature of the oven or sending a signal to turn the oven off. Just as there are countless examples of the functional object 108, there are also countless examples of the application-specific I/O device 110 that are configure to interact with the embodiments of the functional object 108.

The gateway device 112 is a device that is configured to communicate with the server computing device 104 through the network 106. Various embodiments of the gateway device 112 are configured to access the server computing device 104 through the network 106. The gateway device 112 can include one or more wired communication systems or wireless communication systems. In at least some embodiments, the gateway device 112 connects to the network 106 using one or more wired or wireless communication technologies. The gateway device 112 is also configured to communicate with the application-specific I/O device 110.

The server computing device 104 is a device that operates to receive and transmit information to the network-connected object 102. In at least some embodiments, the server computing device 104 includes a profile and data management engine 114 and a database 116.

The profile and data management engine 114 operates to generate and maintain a profile and data for the component devices 109 such as the application-specific I/O device 110 and the gateway device 112. In at least some embodiments, the profile and data management engine 114 operates to provision resources, such as an API key (or client identification key), to the component devices in 109. Additionally, the profile and data management engine 114 may associate the component devices 109 with one or more entities, such as a location, an end-user, or an owner. Alternatively, the profile and data management engine 114 associates the component devices 109 with a different type of entity.

In at least some embodiments, the profile and data management engine 114 includes a web server, such as Internet Information Service (IIS) from Microsoft Corporation of Redmond, Wash. The network-connected object 102 communicates with the profile and data management engine 114 through one or more web services. For example, the network-connected object 102 transmit data or commands to the profile and data management engine 114 using HTTP POST or HTTP GET requests.

The database 116 is a data storage device configured to store a variety of information. Examples of the database 116 include a hard disk drive, a collection of hard disk drives, digital memory (such as random access memory), a redundant array of independent disks (RAID), or other data storage devices. In some embodiments information is distributed across multiple local or remote data storage devices. The database 116 stores data in an organized manner, such as in a hierarchical or relational database structure, or in lists and other data structures such as tables. Although the database 116 is illustrated as being a component of the server computing device 104, in at least some embodiments the database 116 is separate from the server computing device 104.

The network 106 communicates digital data between one or more computing devices, such as between the server computing device 104 and the network-connected object 102. Examples of the network 106 include one or more of a local area network and a wide area network, such as the Internet.

In some embodiments, the network 106 includes a wireless communication system, a wired communication system, or a combination of wireless and wired communication systems. A wired communication system can transmit data using electrical or optical signals in various possible embodiments. Wireless communication systems typically transmit signals via electromagnetic waves, such as in the form of optical signals or radio frequency (RF) signals. A wireless communication system typically includes an optical or RF transmitter for transmitting optical or RF signals, and an optical or RF receiver for receiving optical or RF signals. Examples of wireless communication systems include Wi-Fi communication devices (such as devices utilizing wireless routers or wireless access points), cellular communication devices (such as devices utilizing one or more cellular base stations), and other wireless communication devices.

Figure 2:
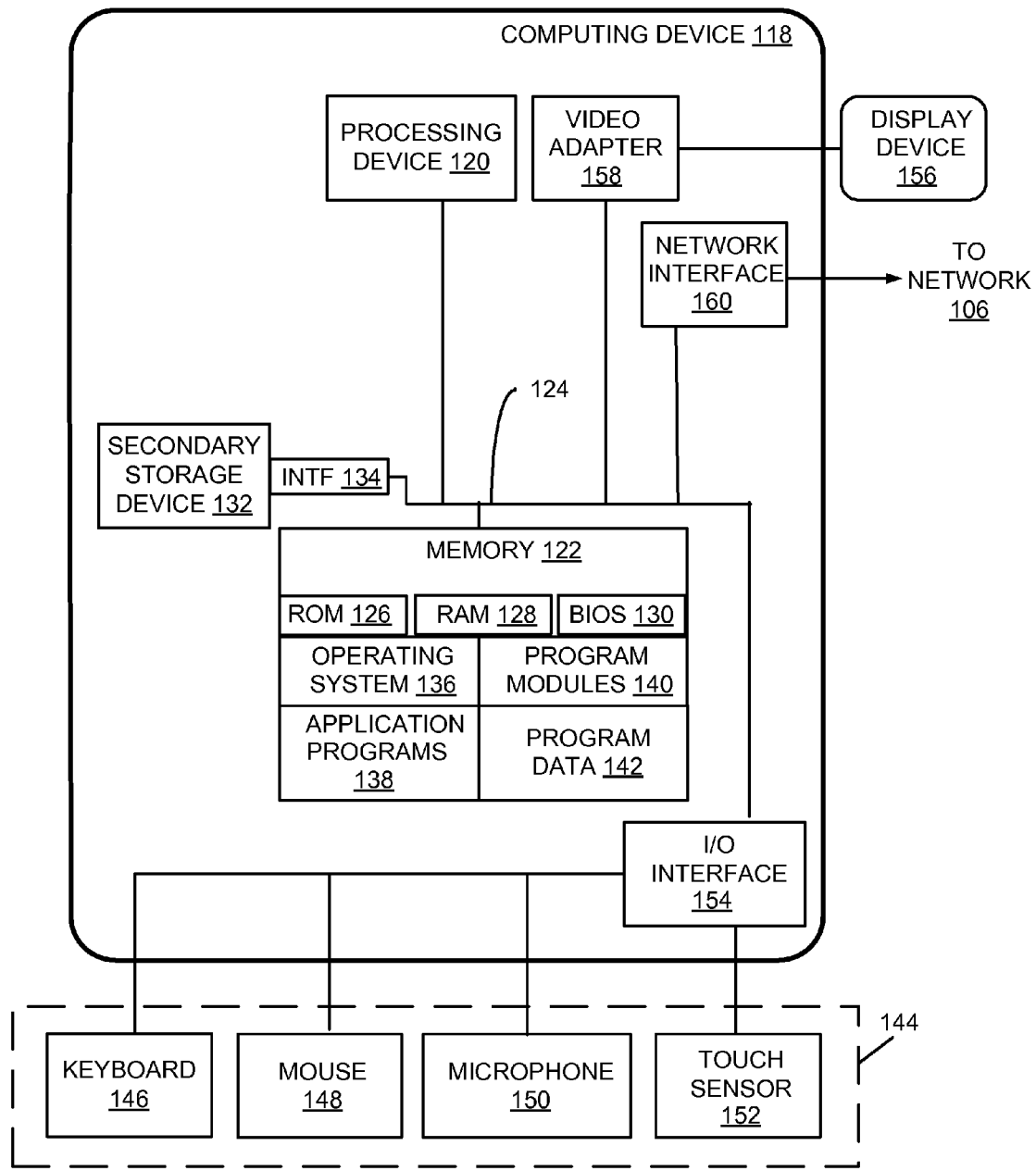
FIG. 2 illustrates an exemplary architecture of a computing device that can be used to implement aspects of the present disclosure.

FIG. 2 illustrates an exemplary architecture of a computing device that can be used to implement aspects of the present disclosure, including the network-connected object 102 and the server computing device 104 and will be referred to herein as the computing device 118. One or more computing devices, such as the type illustrated in FIG. 2, are used to execute the operating system, application programs, and software modules (including the software engines) described herein.

The computing device 118 includes, in at least some embodiments, at least one processing device 120, such as a central processing unit (CPU). A variety of processing devices are available from a variety of manufacturers, for example, Intel or Advanced Micro Devices. In this example, the computing device 118 also includes a system memory 122, and a system bus 124 that couples various system components including the system memory 122 to the processing device 120. The system bus 124 is one of any number of types of bus structures including a memory bus or memory controller, a peripheral bus, and a local bus using any of a variety of bus architectures.

Examples of computing devices suitable for the computing device 118 include a desktop computer, a laptop computer, a tablet computer, a mobile phone device such as a smart phone, or other devices configured to process digital instructions.

The system memory 122 includes read only memory 126 and random access memory 128. A basic input/output system 130 containing the basic routines that act to transfer information within computing device 118, such as during start up, is typically stored in the read only memory 126.

The computing device 118 also includes a secondary storage device 132 in some embodiments, such as a hard disk drive, for storing digital data. The secondary storage device 132 is connected to the system bus 124 by a secondary storage interface 134. The secondary storage devices and their associated computer readable media provide nonvolatile storage of computer readable instructions (including application programs and program modules), data structures, and other data for the computing device 118.

Although the exemplary environment described herein employs a hard disk drive as a secondary storage device, other types of computer readable storage media are used in other embodiments. Examples of these other types of computer readable storage media include magnetic cassettes, flash memory or other solid state memory technology, digital video disks, Bernoulli cartridges, compact disc read only memories, digital versatile disk read only memories, random access memories, or read only memories. Some embodiments include non-transitory media.

A number of program modules can be stored in secondary storage device 132 or memory 122, including an operating system 136, one or more application programs 138, other program modules 140, and program data 142. The data used by the computing device 118 may be stored at any location in the memory 122, such as the program data 142, or at the secondary storage device 132.

In some embodiments, computing device 118 includes input devices 144 to enable the caregiver to provide inputs to the computing device 118. Examples of input devices 144 include a keyboard 146, pointer input device 148, microphone 150, and touch sensor 152. A touch-sensitive display device is an example of a touch sensor. Other embodiments include other input devices 144. The input devices are often connected to the processing device 120 through an input/output interface 154 that is coupled to the system bus 124. These input devices 144 can be connected by any number of input/output interfaces, such as a parallel port, serial port, game port, or a universal serial bus. Wireless communication between input devices 144 and interface 154 is possible as well, and includes infrared, BLUETOOTH® wireless technology, 802.11a/b/g/n, cellular or other radio frequency communication systems in some possible embodiments.

In this example embodiment, a touch sensitive display device 156 is also connected to the system bus 124 via an interface, such as a video adapter 158. In some embodiments, the display device 156 is a touch sensitive display device. A touch sensitive display device includes sensor for receiving input from a user when the user touches the display or, in some embodiments, or gets close to touching the display. Such sensors can be capacitive sensors, pressure sensors, optical sensors, or other touch sensors. The sensors not only detect contact with the display, but also the location of the contact and movement of the contact over time. For example, a user can move a finger or stylus across the screen or near the screen to provide written inputs. The written inputs are evaluated and, in some embodiments, converted into text inputs.

In addition to the display device 156, the computing device 118 can include various other peripheral devices (not shown), such as speakers or a printer.

When used in a local area networking environment or a wide area networking environment (such as the Internet), the computing device 118 is typically connected to the network through a network interface, such as a wireless network interface 160. Other possible embodiments use other communication devices. For example, some embodiments of the computing device 118 include an Ethernet network interface, or a modem for communicating across the network.

The computing device 118 typically includes at least some form of computer-readable media. Computer readable media includes any available media that can be accessed by the computing device 118. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 118. Computer readable storage media is an example of a computer readable data storage device.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

In at least some embodiments of the computing device 118 that are used to implement aspects of the network-connected object 102 or the server computing device 104 do not include all of the elements illustrated in FIG. 2. For example, in at least some embodiments of the computing device 118 used to implement aspects of the network-connected object 102, the video adapter 158 is not included. In at least some other embodiments of the computing device 118 other elements are not included as well.

Figure 3:
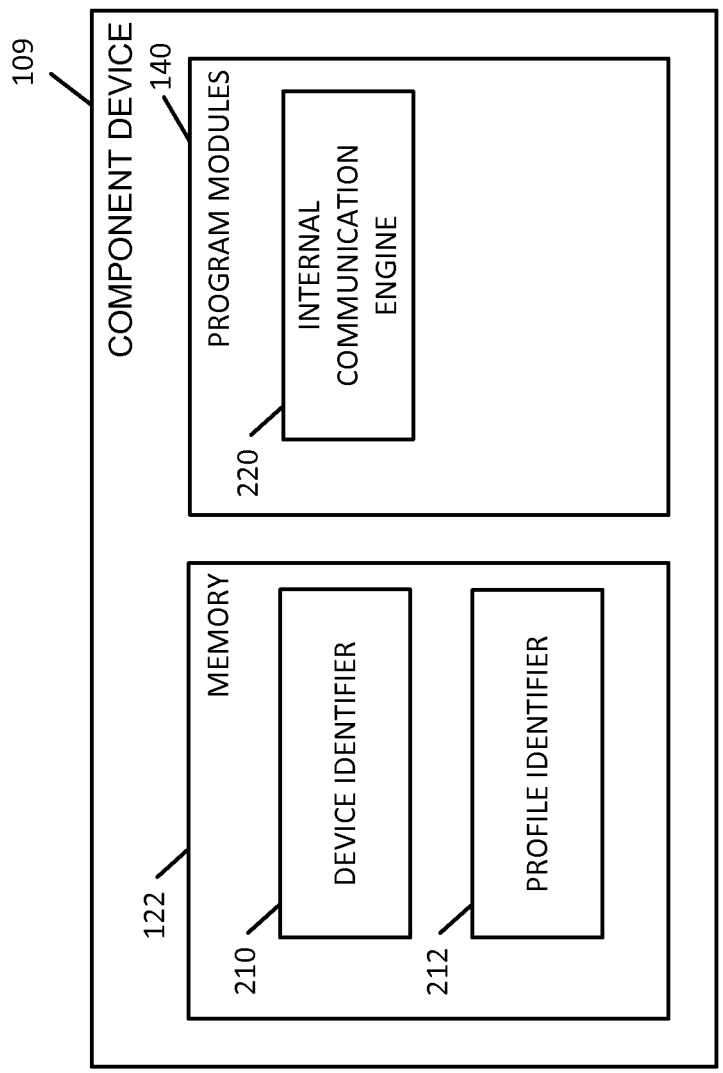
FIG. 3 illustrates an exemplary embodiment of the component device of FIG. 1.

FIG. 3 illustrates an exemplary architecture of the memory 122 and program modules 140 of the component devices 109. The memory 122 includes a device identifier 210 and a profile identifier 212. The memory 122 can include more, fewer, or different types of data than the data shown in FIG. 3. Alternatively, at least one of the device identifier 210 and the profile identifier 212 are stored on the secondary storage device 132.

The program modules 140 include a one or more modules that, when executed by the processing device 120 (shown in FIG. 2), perform one or more operations of the component devices 109. The modules include an internal communication engine 220. The program modules 140 can include more, fewer, or different modules than those shown in FIG. 3.

The device identifier 210 is a value that uniquely identifies a particular component device 109. The device identifier 210 can take the form of a Universally Unique Identifier (UUID). Alternatively, the device identifier 210 may be configured to be unique among the component devices 109 that are configured to connect to the server computing device 104, but is not configured to be universally unique. In at least some embodiments, the device identifier 210 is formed from the vendor ID, the model number, and the serial number of the component device 110. The device identifier 210 can be stored in the ROM 126 and is immutable. In at least some embodiments, the device identifier 210 is stored elsewhere in the memory 122 and can be changed.

The profile identifier 212 is a value that uniquely identifies the component device 109 to the gateway device 112. The profile identifier 212 is received from the gateway device 112 and stored in the memory 122. Alternatively, the component device 109 selects a profile identifier 212 and communicates that profile identifier 212 to the gateway device 112. The profile identifier 212 can be stored in the RAM 128. Alternatively, the profile identifier 210 is stored elsewhere in the memory 122.

The internal communication engine 220 operates to communicate with some or all of the other component devices 109. In at least some embodiments, the internal communication engine 220 communicates using one or more of Universal Asynchronous Receiver/Transmitter (UART), Inter-Integrated Circuit (I2C), and Serial Peripheral Interface (SPI) bus communication technologies. Other communication technologies are used in at least some embodiments as well.

Figure 4:
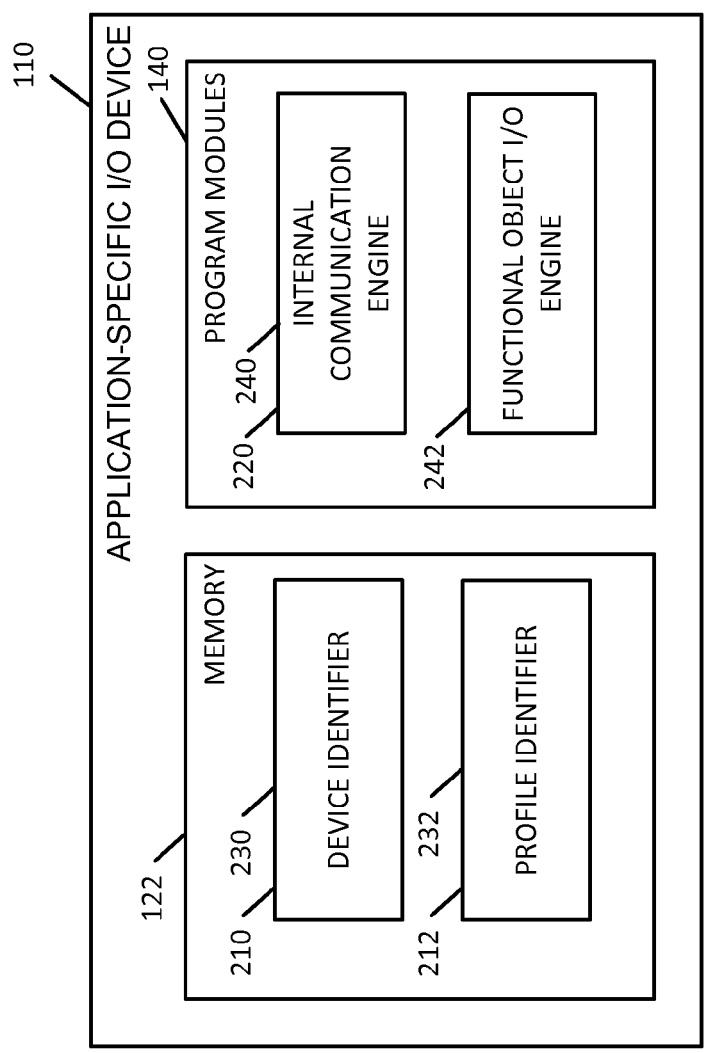
FIG. 4 illustrates an exemplary embodiment of the application-specific I/O device of FIG. 1.

FIG. 4 illustrates an exemplary architecture of the memory 122 and program modules 140 of the application-specific I/O device 110. The application-specific I/O device 110 is an embodiment of a component device 109. The memory 122 includes a device identifier 230 and a profile identifier 232. The device identifier 210 is an example of the device identifier 230. The profile identifier 212 is an example of the profile identifier 232. The memory 122 can include more, fewer, or different types of data than the data shown in FIG. 4. Alternatively, at least one of the device identifier 230 and the profile identifier 232 are stored on the secondary storage device 132.

The program modules 140 include a plurality of modules that, when executed by the processing device 120 (shown in FIG. 2), perform one or more operations of the application-specific I/O device 110. The modules include an internal communication engine 240 and a functional object I/O engine 242. The internal communication engine 220 is an example of the internal communication engine 240. The program modules 140 can include more, fewer, or different modules than those shown in FIG. 4.

The functional object I/O engine 242 operates to perform one or more of controlling and monitoring the functional object 108. The functional object I/O engine 242 may include one or more sensors configured to measure a property or status of the functional object 108. In at least some embodiments, the sensors monitors a temperature, pressure, or status (e.g., on/off) of the functional object 108. Additionally, the functional object 108 can include electronic control circuits configured to control the functional object 108. Various embodiments of the application-specific I/O device 110 will include various sensors and electronic control circuits based on the type of functional object 108 it is configured to interact with. For example, an embodiment of the application-specific I/O device 140 included in an embodiment of the network-connected object 102 that operates as a garage door will include different sensors and electronic control circuits than an embodiment of the application-specific I/O device 140 included in an embodiment of the network-connected object 102 that operates as an animal trap.

Figure 5:
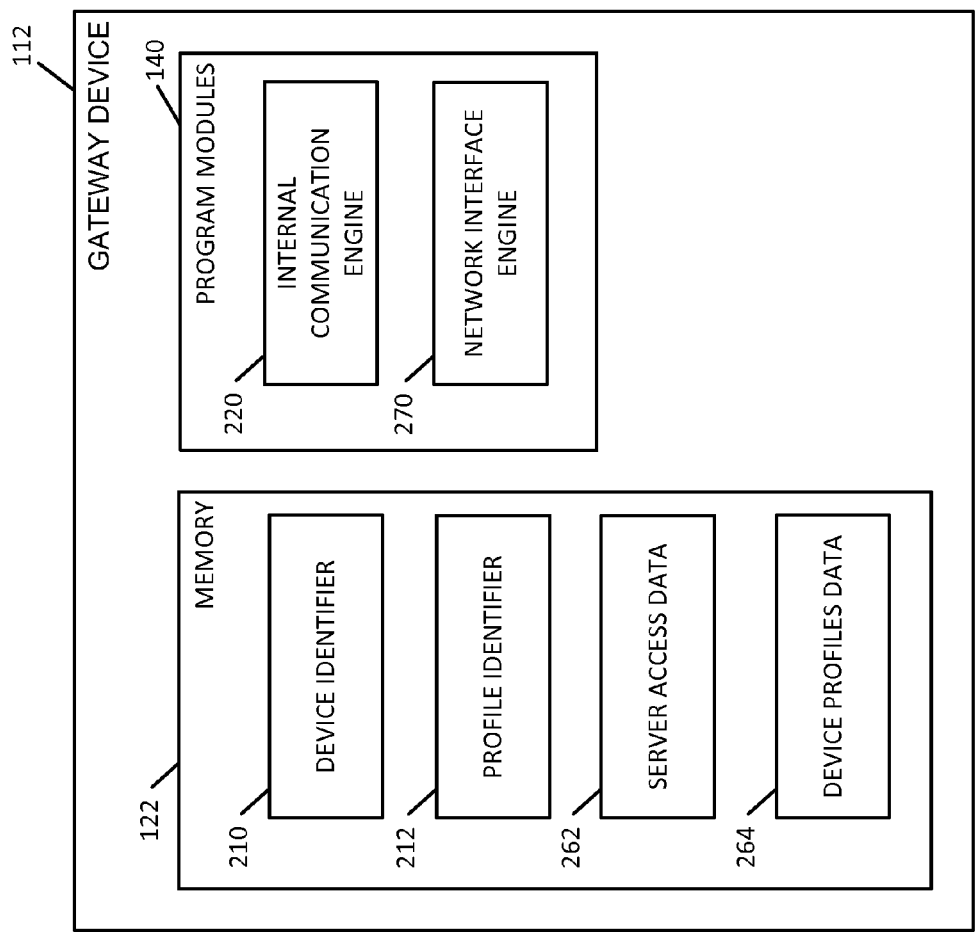
FIG. 5 illustrates an exemplary embodiment of the gateway device of FIG. 1.

FIG. 5 illustrates an exemplary architecture of the memory 122 and program modules 140 of the gateway device 112. The gateway device 112 is an embodiment of a component device 109. The memory 122 includes a device identifier 260, a profile identifier 262, server access data 264, and device profiles data 266. The device identifier 210 is an example of the device identifier 260. The profile identifier 212 is an example of the profile identifier 262. The memory 122 can include more, fewer, or different types of data than the data shown in FIG. 5. Alternatively, at least one of the device identifier 260, profile identifier 262, server access data 264, and device profiles data 266 are stored on the secondary storage device 132.

The program modules 140 include a plurality of modules that, when executed by the processing device 120 (shown in FIG. 2), perform one or more operations of the gateway device 112. The modules include an internal communication engine 270 and a network interface engine 272. The internal communication engine 220 is an example of the internal communication engine 270. The program modules 140 can include more, fewer, or different modules than those shown in FIG. 5.

The server access data 264 comprises information for connecting to the server computing device 104 over the network 106. In at least some embodiments, the server access data includes one or more of an Internet Protocol (IP) address, a port number, a communications protocol (e.g., http), and a uniform resource locator (URL). Additionally, the server access data 264 can include security information such as a password or encryption key.

The device profiles data 266 comprises information about the component devices 109 (e.g., the application-specific I/O device 110) that are using the gateway device 112 to communicate with the server computing device 104. In at least some embodiments, the device profiles data 266 includes a client identification key (CIK) and a profile identifier for each device that uses the gateway device. The CIK is assigned by the server computing device 104. The profile identifier is assigned by the gateway device 112 or requested by the device.

The network interface engine 272 operates to transmit and receive data from the server computing device 104. The network interface engine 272 uses the server access data 264 to communicate with the server computing device 104. Additionally, the network interface engine 272 uses one or more communication technologies to access the server computing device 104.

Figure 6:
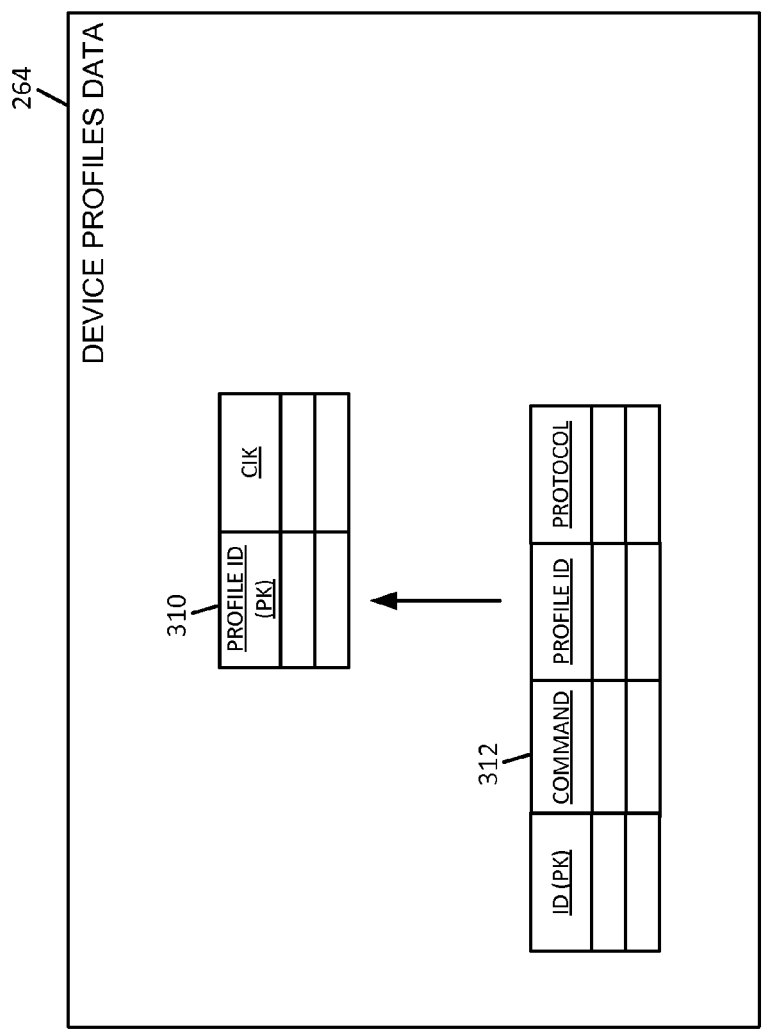
FIG. 6 is an example device profile data table that is stored in the memory of some embodiments of the gateway device of FIG. 1.

FIG. 6 illustrates an example format of the device profiles data 266. In this example, the device profiles data 266 is contained in a plurality of data structures in the form of tables utilizing primary keys (PK). The device profiles data 266 includes a device profiles table 310, and a command table 312. Additional tables are included in other embodiments as needed. Further, some embodiments include different table structures. For example, the data from multiple tables can be merged into a single table or the data from a single table can be separated into multiple tables.

The device profiles table 310 includes information about the component devices 109 that use the gateway device 112 to communicate with the server computing device 104. In at least some embodiments, the device profiles table 310 includes profile ID and client identification key (CIK) fields. The profile ID stores data to uniquely identify a particular device to the gateway device 112. The profile ID data can be generated by the gateway device 112 or requested by a device that uses the gateway device 112. The CIK field stores data that uniquely identifies the component device 109 to the server computing device 104 and is generated by the server computing device 104. The server computing device 104 can use the CIK to access or store additional profile information or data for a component device 109.

The command table 312 includes information related to commands that the gateway device 112 has received from component devices 109. In at least some embodiments, the command table includes ID, command, profile ID, and protocol fields. The ID field stores data that uniquely identifies records in the command table 312 and is the primary key to the command table 312. The command field stores data that represents the command that was received (e.g., a character string). The profile ID field stores a foreign key to the device profiles table 310 that associates the command with a record in the device profiles table 310. In this manner, the command can be associated with a particular component device 109 and profile in the gateway device 112 and on the server computing device 104. The protocol field includes data that represents the communications protocol that was used to transmit the command to the gateway device 112. In this manner, the gateway device 112 can respond to a command using that same communication protocol.

The gateway device 112 supports many different types of commands. In at least some embodiments, the gateway device 112 transmits a response to the component sending component device 109 for each command it receives. That response may include data that was requested or a simple acknowledgment that the command was received and processed. For some commands (e.g., subscriptions), the gateway device 112 may at an unspecified time transmit one or more additional messages to the component device 109. These messages are referred to as unsolicited communication because they are not sent as an immediate response to a command.

In some embodiments, the command table 312 includes data representing only those commands that may generate unsolicited communication. Alternatively, the command table 312 may include data representing all of the commands the gateway device 112 has received. As another alternative, the command table 312 may include data representing a predetermined number of the most recently received commands. The predetermined number can be based on the amount of memory 122 available for the command table 312 or other criteria. Other embodiments of the command table 312 are possible as well.

This example structure of the device profiles data 266 illustrated in FIG. 6 is an example of one possible structure. Various other embodiments utilize other data structures and contain more or fewer data tables and data fields.

Figure 7:
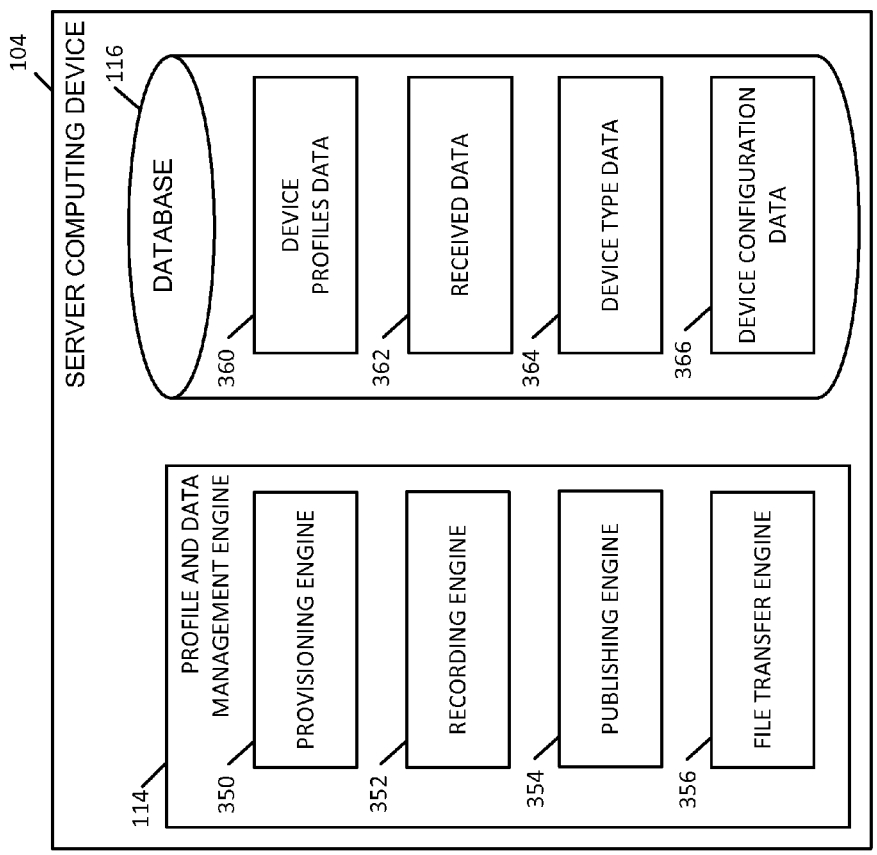
FIG. 7 illustrates an exemplary embodiment of the server computing device of FIG. 1.

FIG. 7 illustrates an exemplary embodiment of the profile and data management engine 114 and database 116 of the server computing device 104. The profile and data management engine 114 includes a provisioning engine 350, a recording engine 352, a publishing engine 354, and a file transfer engine 356. The database 116 includes device profiles data 360, received data 362, device type data 364, and device configuration data 366.

The provisioning engine 350 operates to identify the component devices 109 and to associate the component device 109 with device profile information. In at least some embodiments, the component devices 109 are associated with the device profile information based on the device identifier 210. Additionally, the provisioning engine 350 operates to assign a CIK to the devices. The CIK may be included by the devices with future communication so that the profile and data management engine 114 is able to identify the component device 109 that sent the communication.

The recording engine 352 operates to process and store data received from the component devices 109. The publishing engine 354 operates to transmit data to one or more of the component devices 109. The file transfer engine 356 operates to transmit file information, such as file listings or file content, to the component devices 109.

The device profiles data 360 includes data representing the component devices 109. The received data 362 includes data, such as measurement or status information, received from the component devices 109. The device type data 364 includes information about the type of component devices 109 that the server computing device 104 is configured to interact with. The device configuration data 366 includes information about the software available on the server computing device 104 for the component devices. For example, the device configuration data 366 can indicate that a new version of firmware is available for a particular type of the component devices 109.

Figure 8:
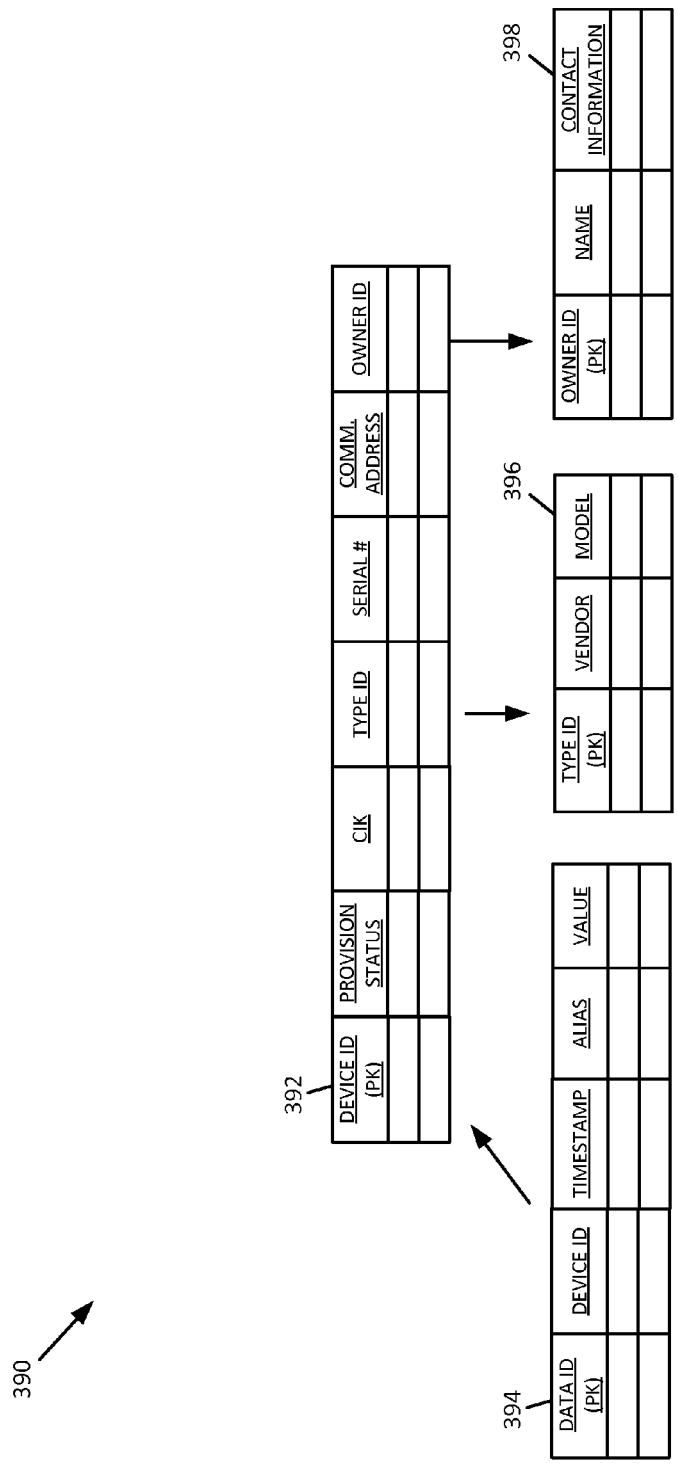
FIG. 8 illustrates an example table structure of the device profiles data of the server computing device of FIG. 1.

FIG. 8 illustrates an example format of data 390 that is stored in at least some embodiments of the database 116. In this example, the data 390 is contained in a plurality of data structures in the form of tables utilizing primary keys (PK). The data 390 includes a device profiles table 392, a received data table 394, a device type table 396, and an owner table 398. Additional tables are included in other embodiments as needed. Further, some embodiments include different table structures. For example, the data from multiple tables can be merged into a single table or the data from a single table can be separated into multiple tables.

The device profiles table 392 includes information about the component devices 109 that the server computing device 104 is configured to interact with. For example, the device profiles table 392 can store the device profiles data 360. In at least some embodiments, data representing the component devices 109 is added to the device profiles table 392 by the vendor of the network-connected object 102 at or around the time the network-connected object 102 is sold to an end-user. In at least some embodiments, the device profiles table 392 includes device ID, provision status, and client identification key (CIK), type ID, serial #, communication address, and owner ID fields.

The device ID field stores data to uniquely identify a particular component device 109 to the server computing device 104. For example, the device ID can be automatically generated as unique key by the database 116. The provision status field stores data that indicates whether the device has been provisioned to an owner.

The CIK field stores data, such as a character string, that is configured to uniquely identify and associate communication received with a particular component device 109. The data stored in the CIK field is regenerated upon the occurrence of certain events (e.g., the component device 109 requesting a new CIK, a change to the ownership information for the component device 109, etc.). In at least some embodiments, the CIK field references a secondary table that includes detailed information about the CIK (e.g., a timestamp indicating when the CIK was generated, a Boolean value indicating whether the CIK is valid, etc.).

The type id field stores data that references a record in the device type table 396 that corresponds to the type of device. The serial # field stores data representing the serial number of the device. The communication address field stores data used to communicate with the device, such as an IP address and a port. The data stored in the communication address field for the application-specific I/O device 110 may correspond to the communication address of the gateway device 112. Other embodiments store other data that is used to communicate with the devices. The owner ID field stores data that references a record in the owner table 398 that corresponds to the owner the device is provisioned to. Alternatively or additionally, a device can provisioned to an operator or a location. Additional fields can be included to reference an operator or location.

The received data table 394 includes information representing data received from the component devices 109 that the server computing device 104 is configured to interact with. For example, the received data table 394 can store the received data 362. In at least some embodiments, the received data table 394 includes data ID, device ID, timestamp, alias, and value fields.

The data ID field stores data to uniquely identify a particular record in the received data table 394. For example, the data ID can be automatically generated as a unique key by the database 116. The device ID field stores data that references a record in the device profiles table 392 that corresponds to the device that transmitted the data. The timestamp field stores data corresponding to the time the data was received. Alternatively, the timestamp stores data specified by the device that transmits the data and that corresponds to the time the data was generated. The alias field stores data (e.g., a character string) that indicates the type of data that was received. Examples of the alias data include the character strings "TEMPERATURE," "WEIGHT," "VOLTAGE," and "STATUS." The value field stores the data that was transmitted by the device. In at least some embodiments, multiple value fields are included and are used to store different types of data. Alternatively, the value field stores data that identifies a record in one or more other tables that are configured to store various types of data. The other table can be identified based on the data stored in the alias field or another identifier of data type.

The device type table 396 includes information representing the types of devices the server computing device 104 is configured to interact with. For example, the device type table 396 can store the device type data 364. In at least some embodiments, the device type table 396 includes type ID, vendor, and model fields.

The type ID field stores data to uniquely identify a particular record in the device type table 396. For example, the type ID can be automatically generated as a unique key by the database 116. The vendor field stores data representing the vendor of the device. In at least some embodiments, the vendor field stores an ID that can be used to uniquely identify a particular vendor. Alternatively or additionally, the vendor field stores a character string that corresponds to the name of the vendor. The model field stores data representing the model of the device. In at least some embodiments, the model field stores an ID that when combined with the data stored in the vendor field can be used to uniquely identify a particular device model. Alternatively or additionally, the model field stores a character string that corresponds to the name of the device model.

The owner table 398 includes information representing potential owners of the component devices 109 that the server computing device 104 is configured to interact with. In at least some embodiments, the owner table 398 includes owner ID, name, and contact information fields.

The owner ID field stores data to uniquely identify a particular record in the owner table 398. For example, the owner ID can be automatically generated as a unique key by the database 116. The name field store data, such as a character string, that represents the name of the owner of the device. The contact information stores data, such as character strings, representing the contact information for the owner. The contact information can include one or more e-mail addresses, physical addresses, and phone numbers. In at least some embodiments, the owner ID field includes more than one field to store contact information.

This example structure of the data 390 illustrated in FIG. 8 is an example of one possible structure. Various other embodiments utilize other data structures and contain more or fewer data tables and data fields.

Figure 9:
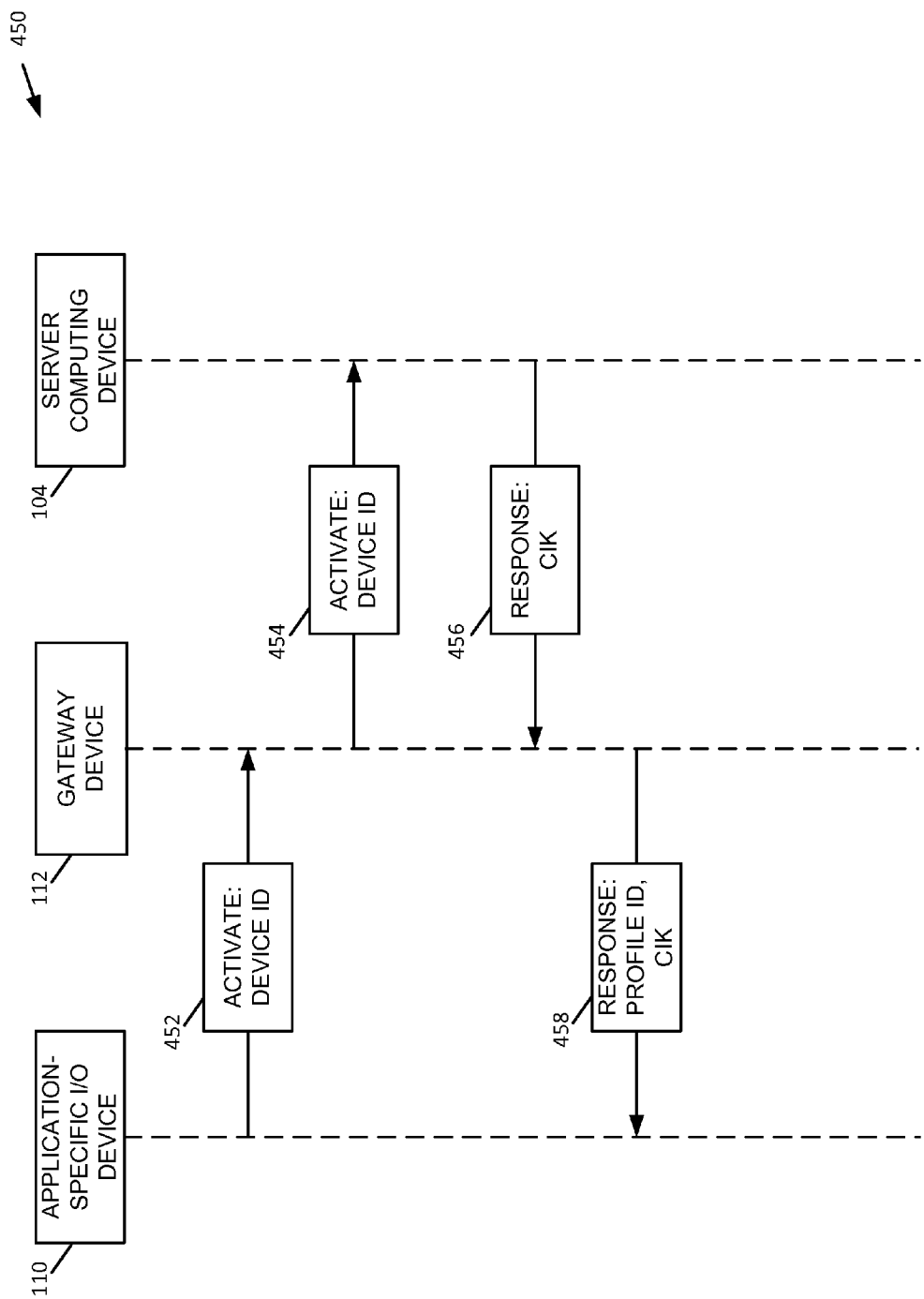
FIG. 9 illustrates an example process for activating an application-specific I/O device with the system of FIG. 1.

FIG. 9 illustrates an example method 450 for operating at least some embodiments of the system 100 to activate the application-specific I/O device 110. In this example, the method 450 includes operations 452, 454, 456, and 458. The method 450 includes operations that are performed by one or more processors (such as the processing device 120, shown in FIG. 2).

In at least some embodiments, the method 450 is performed when the network-connected object 102 is activated and connected to the network 106 for the first time. Alternatively, the method 450 is performed when the application-specific I/O device 110 is activated and does not have a profile identifier 232. Other embodiments perform method 450 at other times as well.

At operation 452, the application-specific I/O device 110 transmits an activate command to the gateway device 112 and the gateway device 112 receives the active command from the application-specific I/O device 110. The activate command includes data that represents the device identifier 230 (shown in FIG. 4). The activate command may be transmitted by the application-specific I/O device 110 to the gateway device 112 using UART or I2C. Alternatively, other methods of transmitting the activate command are used. In at least some embodiments, the gateway device 112 generates a profile ID for the application-specific I/O device 110 and stores the profile ID in the device profiles data (shown in FIG. 6). Alternatively, the application-specific I/O device 110 includes a profile ID with the activate command.

At operation 454, the gateway device 112 transmits the activate command to the server computing device 104, and the server computing device 104 receives the activate command from the gateway device 112. The activate command includes the data that represents the device identifier 230 (shown in FIG. 4) that the gateway device 112 received from the application-specific I/O device 110 in operation 452. The activate command may be transmitted over the network 106 by the gateway device 112 to the server computing device 104.

In response to receiving the activate command, the server computing device 104 generates a CIK for the application-specific I/O device 110. The CIK is stored in the device profiles table 392 in a record associated with the application-specific I/O device 110. Alternatively, in at least some embodiments, if a CIK has previously been generated for the application-specific I/O device 110, the server computing device 104 returns that CIK rather than generating a new CIK.

At operation 456, the server computing device 104 transmits a response to the activate command to the gateway device 112, and the gateway device 112 receives the response from the server computing device 104. The response includes a CIK (shown in FIG. 8). Additionally, in at least some embodiments, the response also includes a status message, such as OK or ERROR. In response to receiving the CIK, the gateway device 112 stores the CIK in the device profiles data (shown in FIG. 6) and associates the CIK with the profile ID of the application-specific I/O device 110.

At operation 458, the gateway device 112 transmits a response to the activate command to the application-specific I/O device 110, and the application-specific I/O device 110 receives the response from the gateway device 112. The response includes the profile ID that the gateway device 112 has associated with the application-specific I/O device 110. Additionally, in at least some embodiments, the response includes the CIK. The application-specific I/O device 110 stores the profile ID as the profile identifier 232 (shown in FIG. 3). Additionally, in at least some embodiments, the application-specific I/O device 110 also stores the CIK.

Figure 10:
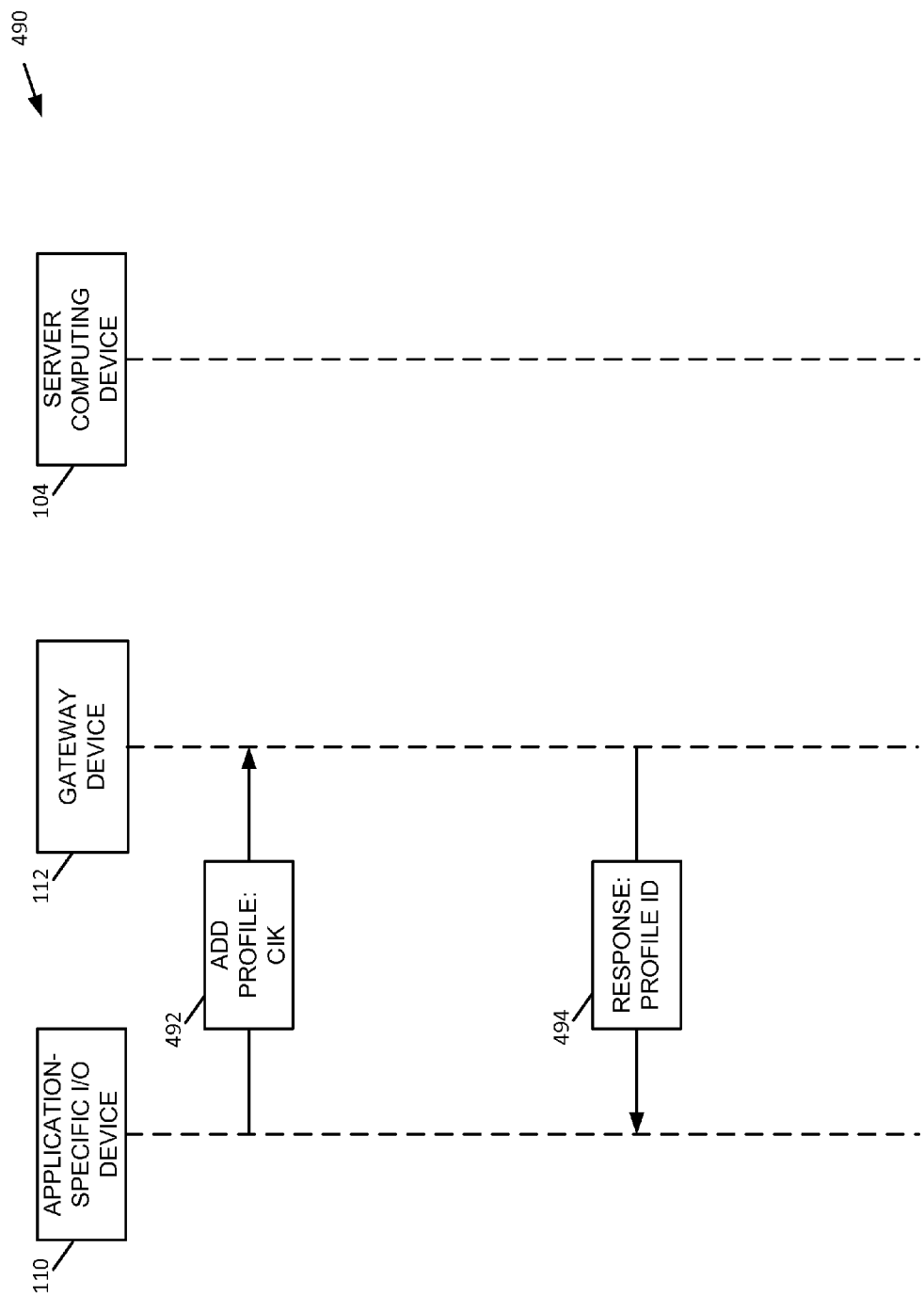
FIG. 10 illustrates an example process for adding a profile for an application-specific I/O device to the gateway device with the system of FIG. 1.

FIG. 10 illustrates an example method 490 for operating at least some embodiments of the system 100 to add a profile to the gateway device 112 for the application-specific I/O device 110. In this example, the method 490 includes operations 492 and 494. The method 490 includes operations that are performed by one or more processors (such as the processing device 120, shown in FIG. 2).

In at least some embodiments, the method 490 is performed when the application-specific I/O device 110 is activated (e.g., powered-on) and has a CIK. Other embodiments perform method 490 at other times as well.

At operation 492, the application-specific I/O device 110 transmits an add profile command to the gateway device 112 and the gateway device 112 receives the add profile command from the application-specific I/O device 110. The add profile command includes data that represents the CIK. In at least some embodiments, the gateway device 112 stores the CIK in the device profiles data (shown in FIG. 6) and associates it with the application-specific I/O device 110. In at least some embodiments, the gateway device 112 generates a profile ID for the application-specific I/O device 110 and stores the profile ID in the device profiles data (shown in FIG. 6). Alternatively, the application-specific I/O device 110 includes a profile ID with the add profile command.

At operation 494, the gateway device 112 transmits a response to the add profile command to the application-specific I/O device 110, and the application-specific I/O device 110 receives the response from the gateway device 112. The response includes the profile ID that the gateway device 112 has associated with the application-specific I/O device 110. The application-specific I/O device 110 stores the profile ID as the profile identifier 232 (shown in FIG. 4).

Figure 11:
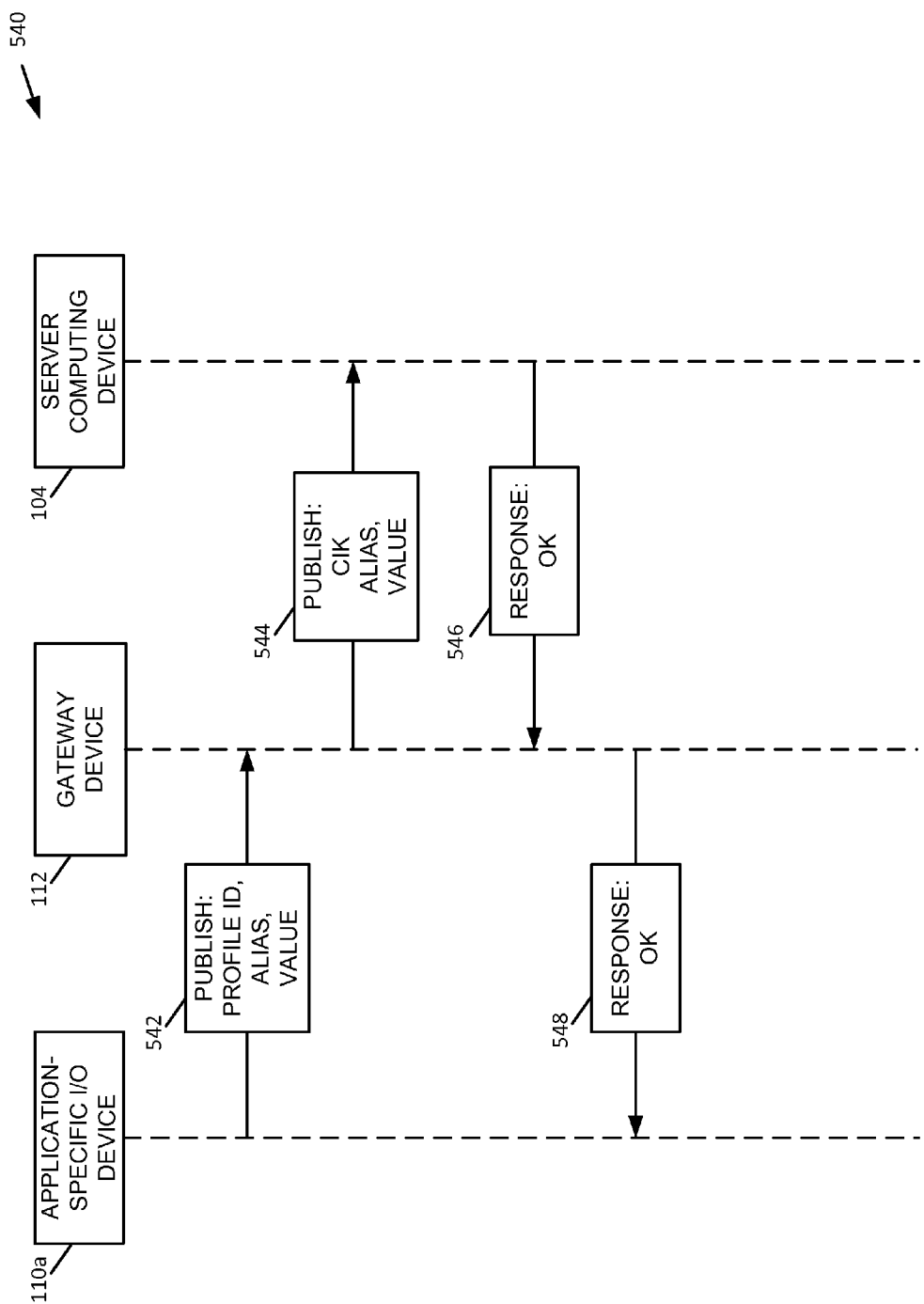
FIG. 11 illustrates an example process for publishing data from an application-specific I/O device to the server computing device of FIG. 1.

FIG. 11 illustrates an example method 540 for operating at least some embodiments of the system 100 to publish data from the application-specific I/O device 110 to the server computing device 104. In this example, the method 540 includes operations 542, 544, 546, and 548. The method 540 includes operations that are performed by one or more processors (such as the processing device 120, shown in FIG. 2).

At operation 542, the application-specific I/O device 110 transmits a publish command to the gateway device 112 and the gateway device 112 receives the publish command from the application-specific I/O device 110. The publish command includes the profile identifier 232 (shown in FIG. 4) and one or more alias-value pairs. In at least some embodiments, the gateway device 112 stores the alias-value pairs.

At operation 544, the gateway device 112 transmits the publish command to the server computing device 104, and the server computing device 104 receives the publish command from the gateway device 112. The publish command includes the CIK associated with the application-specific I/O device 110 that transmitted the publish command to the gateway device 112 in operation 542. In at least some embodiments, the gateway device 112 uses the profile identifier 232 and the device profiles data 266 to determine the CIK associated with the application-specific I/O device 110. The publish command also includes one or more alias-value pairs received from the application-specific I/O device 110. In at least some embodiments, the gateway device 112 transmits each publish command to the server computing device 104 as it is received. Alternatively, the gateway device 112 stores the publish command for a duration of time before transmitting the publish command to the server computing device 104. Additionally, the gateway device 112 can aggregate multiple publish commands received from the application-specific I/O device 110 into a single or fewer publish commands for transmission to the server computing device 104.

Upon receiving the publish command, the server computing device 104 stores the data represented by the alias-value pairs in the received data 362 and associates the alias-value pairs with the application-specific I/O device, which is identified with the CIK. Additionally, in some embodiments, the server computing device 104 publishes the data represented by the alias-value pairs to other devices that have subscribed to the data. An example method for subscribing to data is illustrated in FIG. 12.

At operation 546, the server computing device 104 transmits a response to the publish command to the gateway device 112, and the gateway device 112 receives the response from the server computing device 104. The response includes a status message, such as OK or ERROR. If the status message indicates that server computing device 104 successfully received and stored the data included with the publish command sent in operation 544, the gateway device 112 deletes the alias-value pairs it optionally stored in operation 542. Alternatively, if the status message indicates that an error occurred, the gateway device 112 may try to resend the publish command to the server computing device 104 if the alias-value data was stored.

At operation 458, the gateway device 112 transmits a response to the publish command to the application-specific I/O device 110, and the application-specific I/O device 110 receives the response from the gateway device 112. The response includes the status information generated by the server computing device 104. If the gateway device 112 tried to transmit the alias-value pair data to the server computing device 104 multiple times, only the final status message is transmitted to the application-specific I/O device. Additionally, if the gateway device 112 combined alias-value pairs from multiple individual publish commands into a single aggregate publish command, the gateway device 112 transmits a response to each of the individual publish commands to the application-specific I/O device 110.

Figure 12:
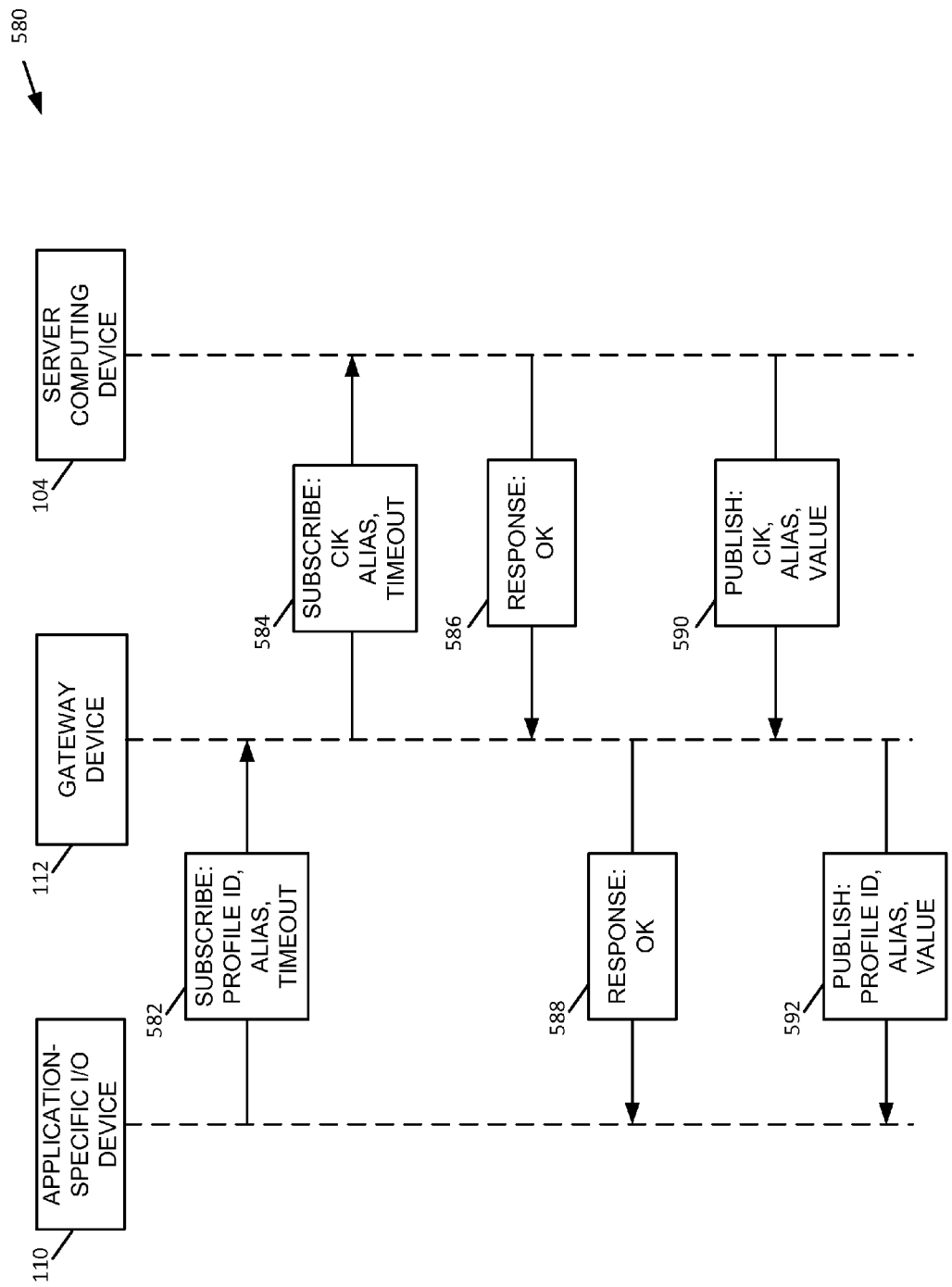
FIG. 12 illustrates an example process for subscribing by the application-specific I/O device to data available on the server computing device of FIG. 1.

FIG. 12 illustrates an example method 580 for operating at least some embodiments of the system 100 to cause the application-specific I/O device 110 to subscribe to data from the server computing device 104. In this example, the method 580 includes operations 582, 584, 586, and 588. The method 580 includes operations that are performed by one or more processors (such as the processing device 120, shown in FIG. 2).

At operation 582, the application-specific I/O device 110 transmits a subscribe command to the gateway device 112 and the gateway device 112 receives the subscribe command from the application-specific I/O device 110. The subscribe command includes the profile identifier 232 (shown in FIG. 4), an alias, and a timeout value. The alias value can be a character string that specifies the type of data being subscribed to. The timeout value specifies how frequently data should be sent back to the application-specific I/O device 110. In at least some embodiments, if the timeout value is not specified, data is sent back to the application-specific I/O device 110 as the data is available.

At operation 584, the gateway device 112 transmits the subscribe command to the server computing device 104, and the server computing device 104 receives the publish command from the gateway device 112. The gateway device 112 transmits the subscribe command as it was received during operation 582 except that it includes the CIK associated with the application-specific I/O device 110 rather than the profile ID. As described elsewhere, the gateway device 112 can use the profile ID to determine the CIK associated with the application-specific I/O device before transmitting the subscribe command to the server computing device 104.

At operation 586, the server computing device 104 transmits a response to the subscribe command to the gateway device 112, and the gateway device 112 receives the response from the server computing device 104. The response includes a status message, such as OK or ERROR. If the status message indicates that an error occurred, the gateway device 112 may try to resend the subscribe command to the server computing device 104.

At operation 588, the gateway device 112 transmits a response to the subscribe command to the application-specific I/O device 110, and the application-specific I/O device 110 receives the response from the gateway device 112. The response includes the status information generated by the server computing device 104.

At operation 590, the server computing device 104 transmits an unsolicited publish command to the gateway device 112, and the gateway device 112 receives the unsolicited publish command from the server computing device 104. The publish command includes the CIK of the application-specific I/O device 110 and one or more alias-value pairs corresponding to the data matching the subscription command of operation 582. In at least some embodiments, the server computing device 104 performs operation 586 any time it receives data that that the application-specific I/O device 110 has subscribed to. Alternatively, the server computing device 104 performs operation 586 after a duration of time specified by the timeout parameter of the subscribe command of operation 582.

At operation 592, the gateway device 112 transmits the unsolicited publish command to the application-specific I/O device 110, and the application-specific I/O device 110 receives the unsolicited publish command from the gateway device 112. The unsolicited publish command includes a profile identifier and the one or more alias-values pairs provided by the server computing device 104. In at least some embodiments, the gateway device 112 uses the CIK and the device profiles data 266 to determine the profile ID associated with the application-specific I/O device 110.

Figure 13:
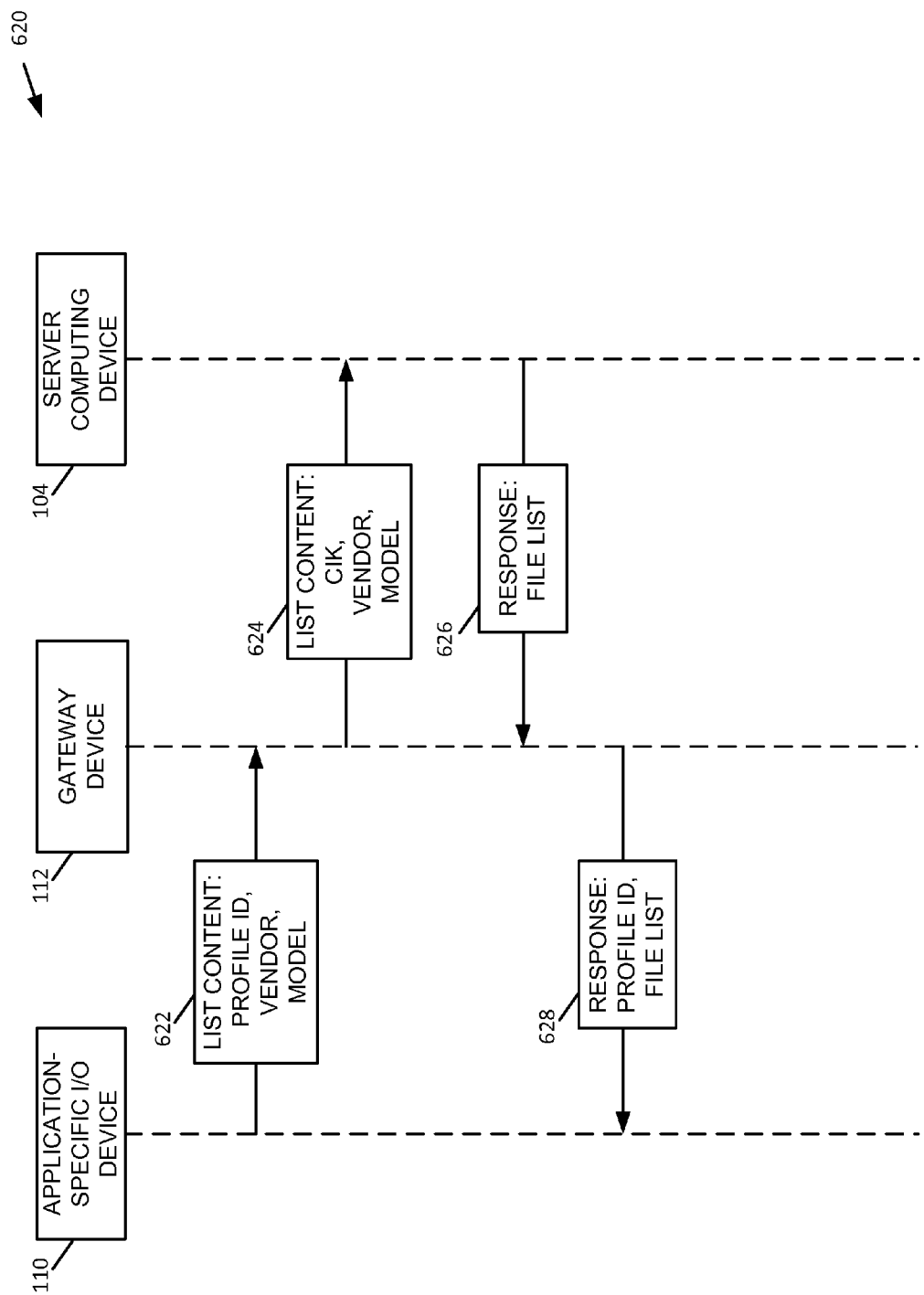
FIG. 13 illustrates an example process for listing content available on the server computing device for the application-specific I/O device of FIG. 1.

FIG. 13 illustrates an example method 620 for operating at least some embodiments of the system 100 to cause the application-specific I/O device 110 to receive a list of content from the server computing device 104. In this example, the method 620 includes operations 622, 624, 626, and 628. The method 620 includes operations that are performed by one or more processors (such as the processing device 120, shown in FIG. 2). As an example, the method 620 is used to determine whether the server computing device 104 contains a new version of the firmware for the application-specific I/O device 110.

At operation 622, the application-specific I/O device 110 transmits a list content command to the gateway device 112 and the gateway device 112 receives the list content command from the application-specific I/O device 110. The list content command includes the profile identifier 232 (shown in FIG. 4). In at least some embodiments, the list content command also includes data associated with the vendor and model of the application-specific I/O device. Alternatively, the vendor and model are not included with the list content command because the server computing device 104 retrieves this information from the device type data 364 instead.

At operation 624, the gateway device 112 transmits the list content command to the server computing device 104, and the server computing device 104 receives the list content command from the gateway device 112. The gateway device 112 transmits the list content command as it was received during operation 622 except that it includes the CIK associated with the application-specific I/O device 110 rather than the profile ID. As described elsewhere, the gateway device 112 can use the profile ID to determine the CIK associated with the application-specific I/O device before transmitting the list content command to the server computing device 104.

At operation 626, the server computing device 104 transmits a response to the list content command to the gateway device 112, and the gateway device 112 receives the response from the server computing device 104. The response includes a list of content available on the server computing device 104 for the application-specific I/O device 110. Examples of the list of content include a list of file names and a list of file identifiers. Additionally, in at least some embodiments, the response also includes a status message, such as OK or ERROR.

At operation 628, the gateway device 112 transmits a response to the list content command to the application-specific I/O device 110, and the application-specific I/O device 110 receives the response from the gateway device 112. The response includes the list of content available on the server computing device 104 for the application-specific I/O device 110. Additionally, the response includes the profile ID that the gateway device 112 has associated with the application-specific I/O device 110.

Figure 14:
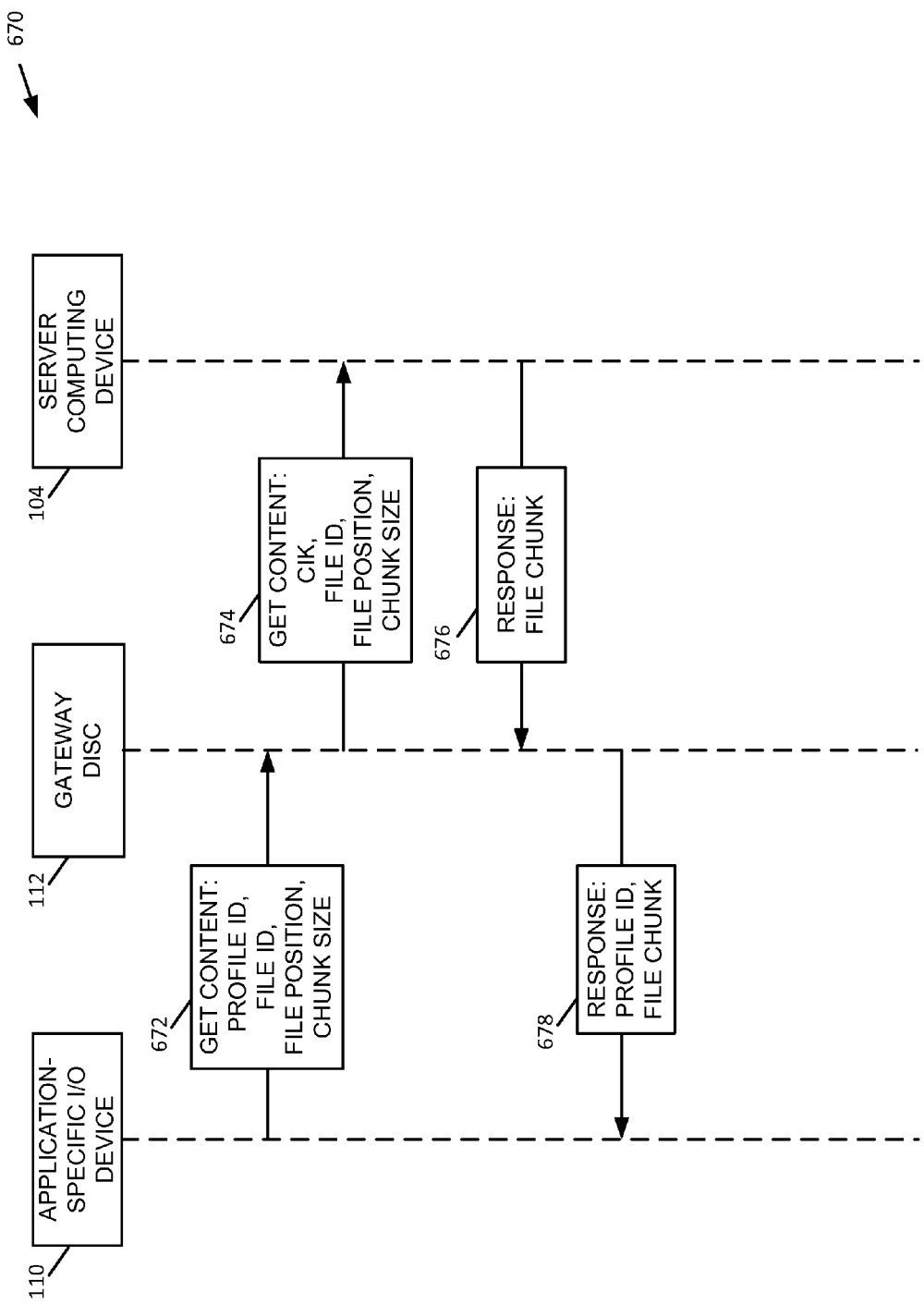
FIG. 14 illustrates an example process for retrieving content available on the server computing device by the application-specific I/O device of FIG. 1.

FIG. 14 illustrates an example method 670 for operating at least some embodiments of the system 100 to cause the application-specific I/O device 110 to receive content from the server computing device 104. In this example, the method 670 includes operations 672, 674, 676, and 678. The method 670 includes operations that are performed by one or more processors (such as the processing device 120, shown in FIG. 2). As an example, the method 670 is used to retrieve a new version of firmware for the application-specific I/O device 110 that is available on the server computing device 104.

At operation 672, the application-specific I/O device 110 transmits a get content command to the gateway device 112 and the gateway device 112 receives the get content command from the application-specific I/O device 110. The get content command includes the profile identifier 232 (shown in FIG. 4), and a file ID. Examples of the file ID include a character string representing the file name and a numeric value representing an ID associated with the file. In at least some embodiments, the get content command also includes file position and chunk size values. The file position and chunk size values can be used to request portions of a file rather than the entire file. The file position value is numeric value that indicates an offset into the file of the first data the server computing device 104 should transmit. The chunk size value is a numeric value that indicates the amount of file data the server computing device 104 should transmit.

As an example, the application-specific I/O device could request a 24-byte file named version2 as three 8-byte chunks using the following commands:

get content: version2, 0, 8;
get content: version2, 8, 8; and
get content: version2, 16, 8.

At operation 674, the gateway device 112 transmits the get content command to the server computing device 104, and the server computing device 104 receives the get content command from the gateway device 112. The gateway device 112 transmits the get content command as it was received during operation 672 except that it includes the CIK associated with the application-specific I/O device 110 rather than the profile ID. As described elsewhere, the gateway device 112 can use the profile ID to determine the CIK associated with the application-specific I/O device before transmitting the get content command to the server computing device 104.

At operation 676, the server computing device 104 transmits a response to the get content command to the gateway device 112, and the gateway device 112 receives the response from the server computing device 104. The response includes the requested content. Additionally, in at least some embodiments, the response also includes a status message, such as OK or ERROR.

At operation 628, the gateway device 112 transmits a response to the get content command to the application-specific I/O device 110, and the application-specific I/O device 110 receives the response from the gateway device 112. The response includes the requested content. Additionally, the response includes the profile ID that the gateway device 112 has associated with the application-specific I/O device 110.

Figure 15:
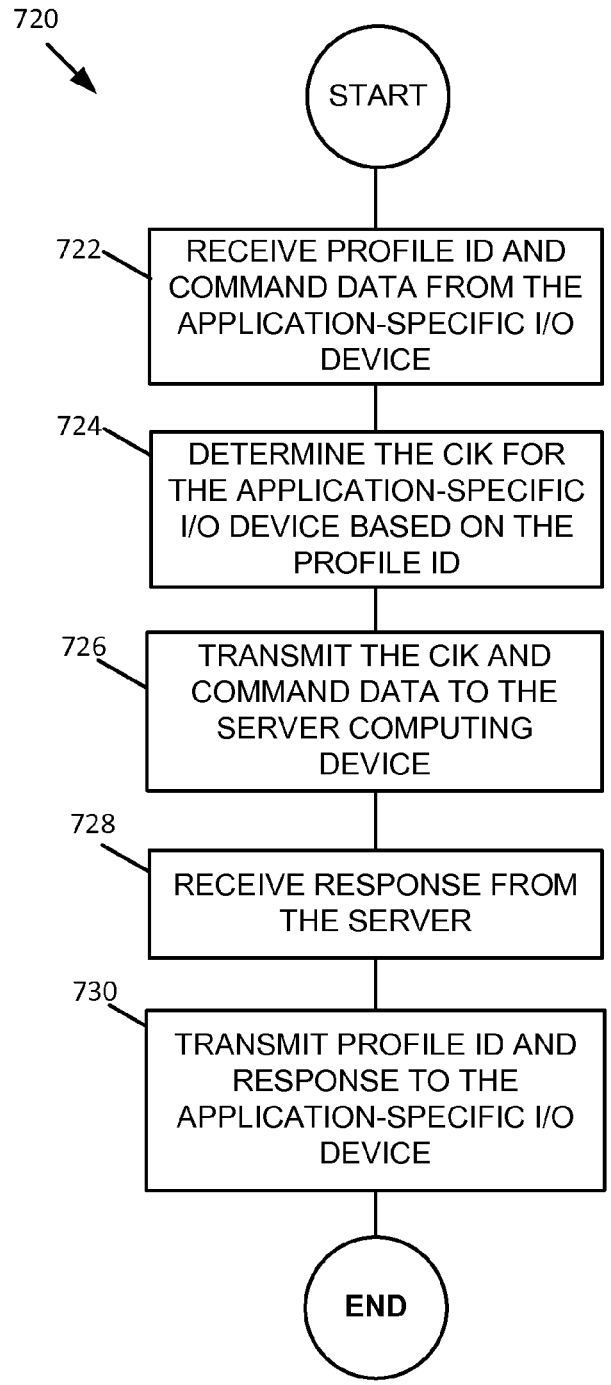
FIG. 15 illustrates an example method performed by embodiments of the gateway device of FIG. 1 for processing a command.

FIG. 15 illustrates an example method 720 for operating at least some embodiments of the gateway device 112 to process a command received from another device (e.g., the application-specific I/O device 110). In this example, the method 670 includes operations 672, 674, 676, and 678. The method 670 includes operations that are performed by one or more processors (such as the processing device 120, shown in FIG. 2). Although FIG. 15 illustrates the method 720 with respect to commands received from the application-specific I/O device 110, in other embodiments the method 720 is performed to process commands received from other devices as well.

At operation 722, the gateway device 112 receives a command from the application-specific I/O device 110. The command includes the profile identifier 232 (shown in FIG. 4) and the command data. The command data may include a character string or numeric value to identify the requested command. Additionally, the command data may include parameters that are required or optional for the command. In at least some embodiments, the command is received using UART or I2C. Receiving commands using UART or I2C can simplify the hardware and processing required to transmit commands on the application-specific I/O device 110. However, in at least some other embodiments, commands are received using other technologies.

At operation 724, the gateway device 112 determines the CIK for the application-specific I/O device 110 based on the profile identifier 232. The gateway device 112 uses the device profiles data 266 to identify the device profile associated with the specified profile identifier 232. The gateway device 112 then determines the CIK associated with that device profile.

At operation 726, the gateway device 112 transmits the CIK and command data to the server computing device 104. The CIK and command data are transmitted to the server computing device using the Transmission Control Protocol/Internet Protocol (TCP/IP). Alternatively, other protocols, such as User Datagram Protocol (UDP) or Constrained Application Protocol (CoAP), are used by the gateway device 112 to transmit commands to the server computing device 104.

At operation 728, the gateway device 112 receives a response to the command from the server computing device 104. In at least some embodiments, the response is received using TCP/IP. In at least some other embodiments, the response is received using a different protocol.

At operation 730, the response is transmitted by the gateway device 112 to the application-specific I/O device 110. The gateway device 112 includes the profile identifier 232 with the response. The response can be transmitted to the application-specific I/O device using the same communication technology (e.g., UART, I2C, etc.) that was used to receive the command.

The method 720 can be used by the gateway device 112 to process a variety of commands that are received form the application-specific I/O device 110, or any other requesting device for that matter. A benefit of at least some embodiments of the gateway device 112 that operate according to method 720 is that the application-specific I/O device 110 can include relatively simple and inexpensive communication hardware and processing capabilities.

Figure 16:
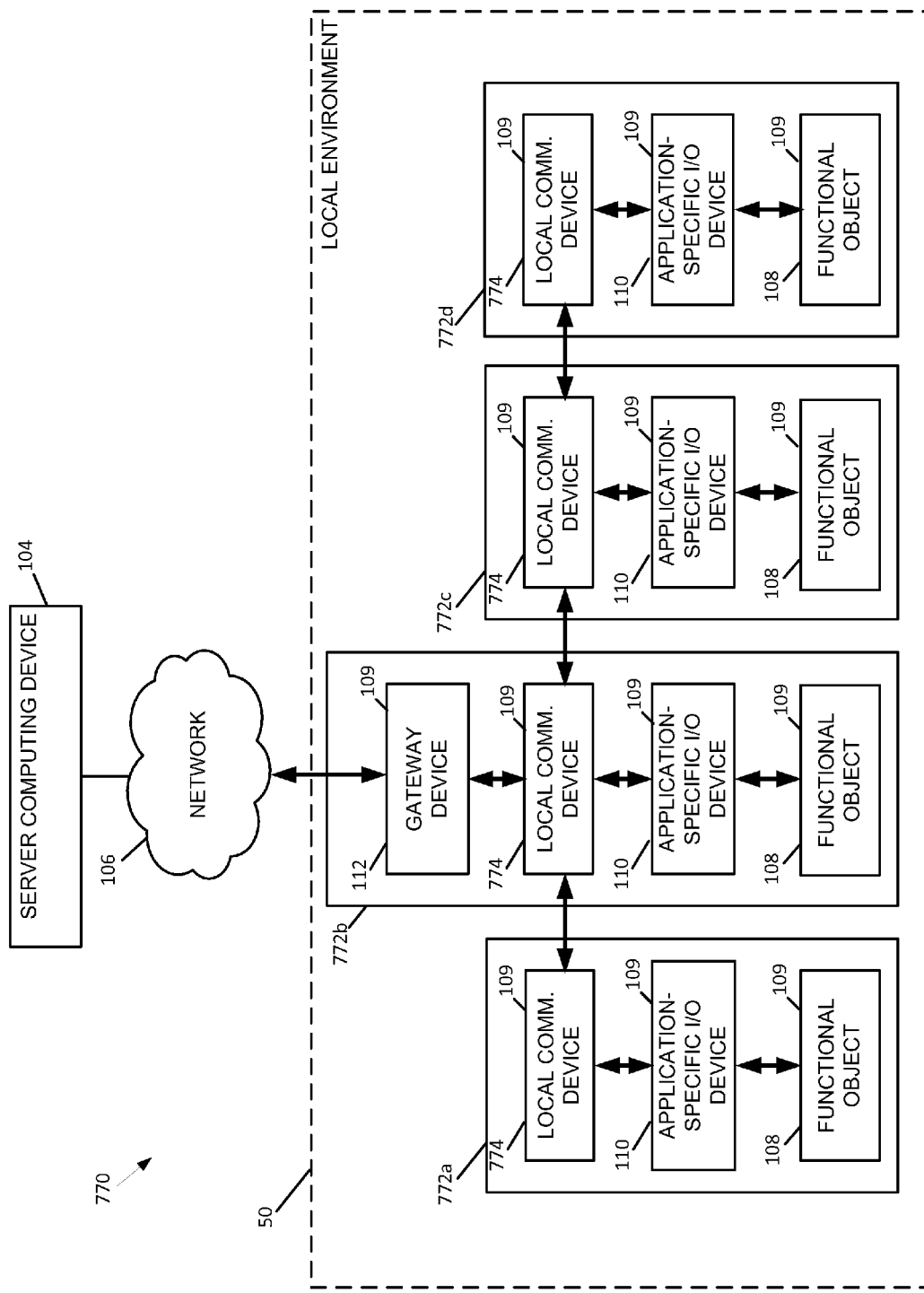
FIG. 16 illustrates another exemplary embodiment of a system for managing network profiles for multiple network-connected objects.

FIG. 16 illustrates an exemplary embodiment of a system 770 for managing profiles and data for multiple network-connected objects. The system 770 includes network-connected objects 772a, 772b, 772c, and 772d (referred to collectively as network-connected objects 772), the server computing device 104, and the network 106. Also shown is the local environment 50.

The network-connected objects 772 each include the functional object 108 and a plurality of component device 109, including the application-specific I/O device 110 and a local communication device 774. Additionally, the network-connected object 772b includes the gateway device 112 as an additional component device 109. Beneficially, in the system 770, multiple network-connected objects 772 use the gateway device 112 to communicate with the server computing device 104.

The local communication device 774 is a component device configured to allow the network-connected objects 772 to communicate with each other. In at least some embodiments, the local communication device 774 implements a wireless mesh network protocol or ad-hoc network. In a mesh network, each local communication device 774 relays data for the network. In this manner, each of the network-connected objects 772 can transmit commands to any of the other network-connected objects 772, which will then be relayed to the intended destination. Beneficially, a mesh networking may allow the local communication device 774 to utilize an inexpensive and low-powered communication protocol, such as ZigBee or Bluetooth Low Energy.

Alternatively, the local communication device 774 can use a different wireless communication protocol or a wired communication protocol.

In the example shown in FIG. 16, the network-connected objects 772*a*, 772*c*, and 772*d* transmit commands and data over to the network-connected object 772*b*. The gateway device 112 in network-connected object 772*b* then transmits the data and commands to the server computing device 104. Additionally, the gateway device 112 can maintain profiles for some or all of the component devices in some or all of the network-connected objects 772. As described elsewhere, the server computing device 104 can also maintain profiles for some or all of the component devices 109 in some or all of the network-connected objects 772.

Figure 17:
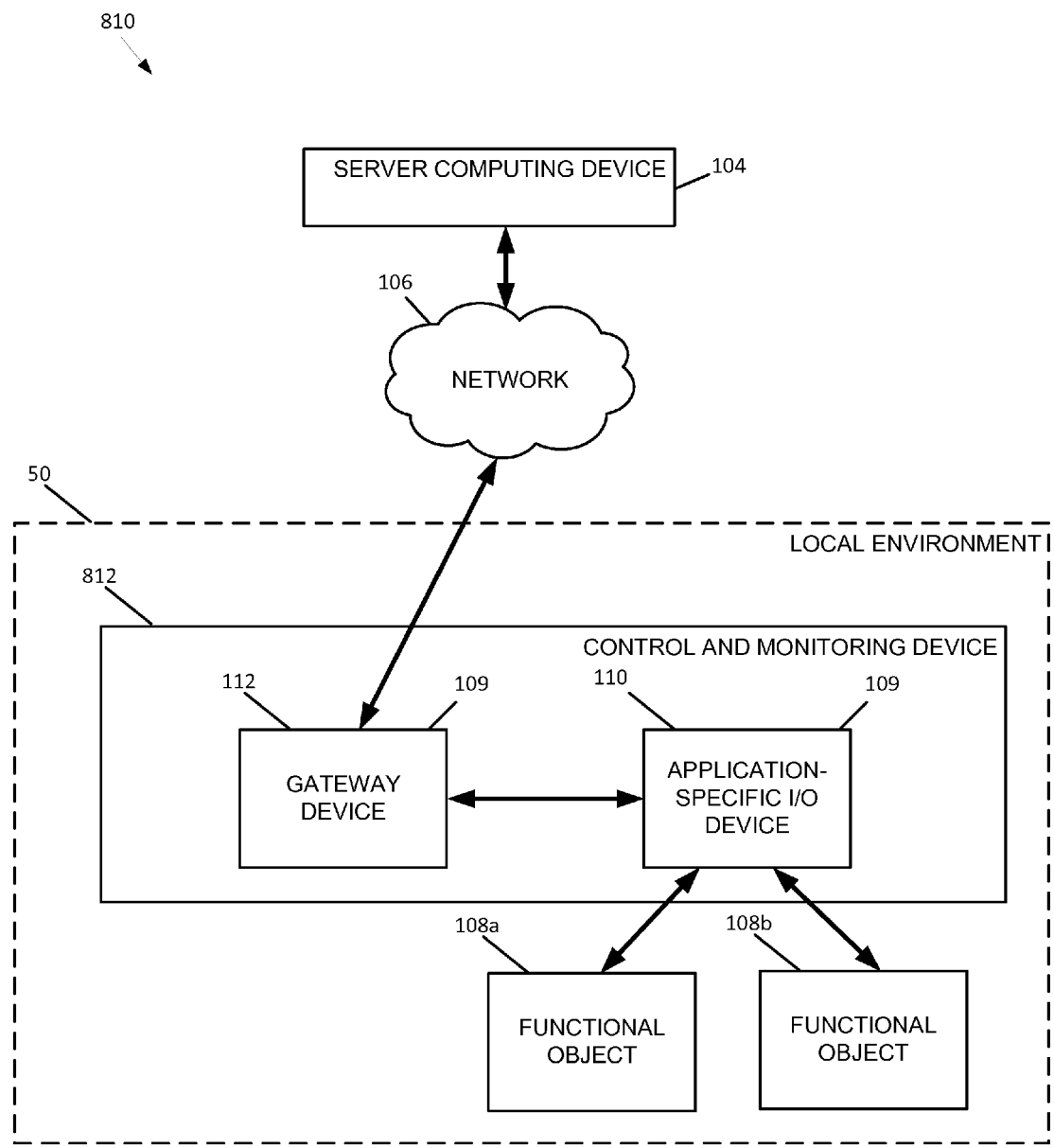
FIG. 17 illustrates another exemplary embodiment of a system for managing network profiles for multiple functional objects.

FIG. 17 illustrates an exemplary embodiment of a system 810 for managing profiles and data for multiple functional objects. The system 810 includes a control and monitoring device 812, functional objects 108*a* and 108*b* (referred to collectively as functional objects 108), server computing device 104, and network 106. Also shown is the local environment 50.

The control and monitoring device 812 is a device that is configured to do one or more of monitoring and controlling one or more functional objects 108. The control and monitoring device 812 includes a plurality of component devices 109, including the application-specific I/O device 110 and the gateway device 112.

One benefit of some embodiments of the system 810 is that expense of the application-specific I/O device 110 and the gateway device 112 do not need to be incurred for each of the functional objects 108. As an example, the system 810 can be used to monitor the temperatures of multiple ovens. As another example, the system 810 can be used to monitor the voltage levels of multiple batteries. There are many other uses for the system 810 as well.

In at least some other embodiments, the control and monitoring device 812 include more than one application-specific I/O device 110. For example, some embodiments include one application-specific I/O device 110 for each of the functional objects 108 being monitored. As another example, some embodiments include more than one application-specific I/O device 110 to monitor different parameters. For example, the application-specific I/O device 110 could be configured to measure temperature, while another application-specific I/O device could be configured to measure voltage.

Figure 18:
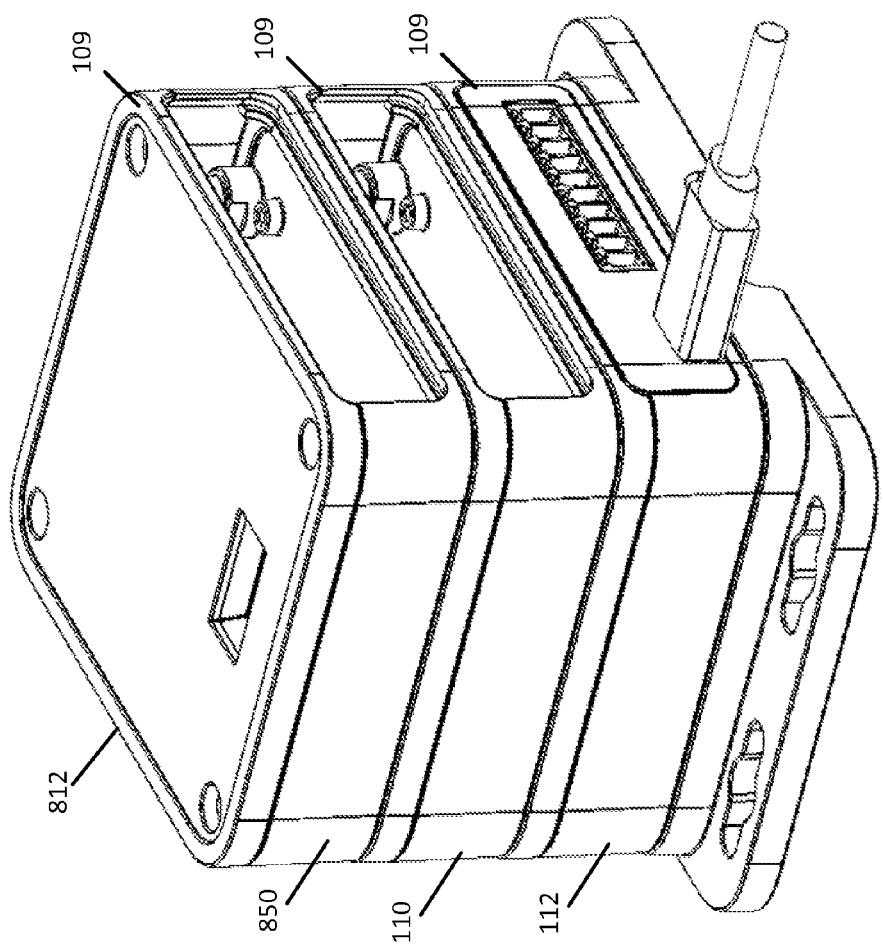
FIG. 18 illustrates an example embodiment of the control and monitoring device of FIG. 17.

FIG. 18 illustrates an example embodiment of the control and monitoring device 812. The control and monitoring device 812 includes a plurality of component devices 109. In this example, the control and monitoring device 812 includes the gateway device 112, the application-specific I/O device 110, and another component device 850. In some embodiments, the component device 850 is an additional application-specific I/O device, a local communication device, or another type of component device (e.g., a battery device).

Although the control and monitoring device 812 is shown as being comprised of three physically separate devices. In at least some embodiments, the component devices are implemented as separate integrated circuits in a single physical structure or as separate components on a single integrated circuit. Other embodiments are possible as well.

Additionally, in some embodiments, the network-connected object 102 is comprised of the control and monitoring device 812 and the functional object 108. Other embodiments are possible as well.

Figure 19:
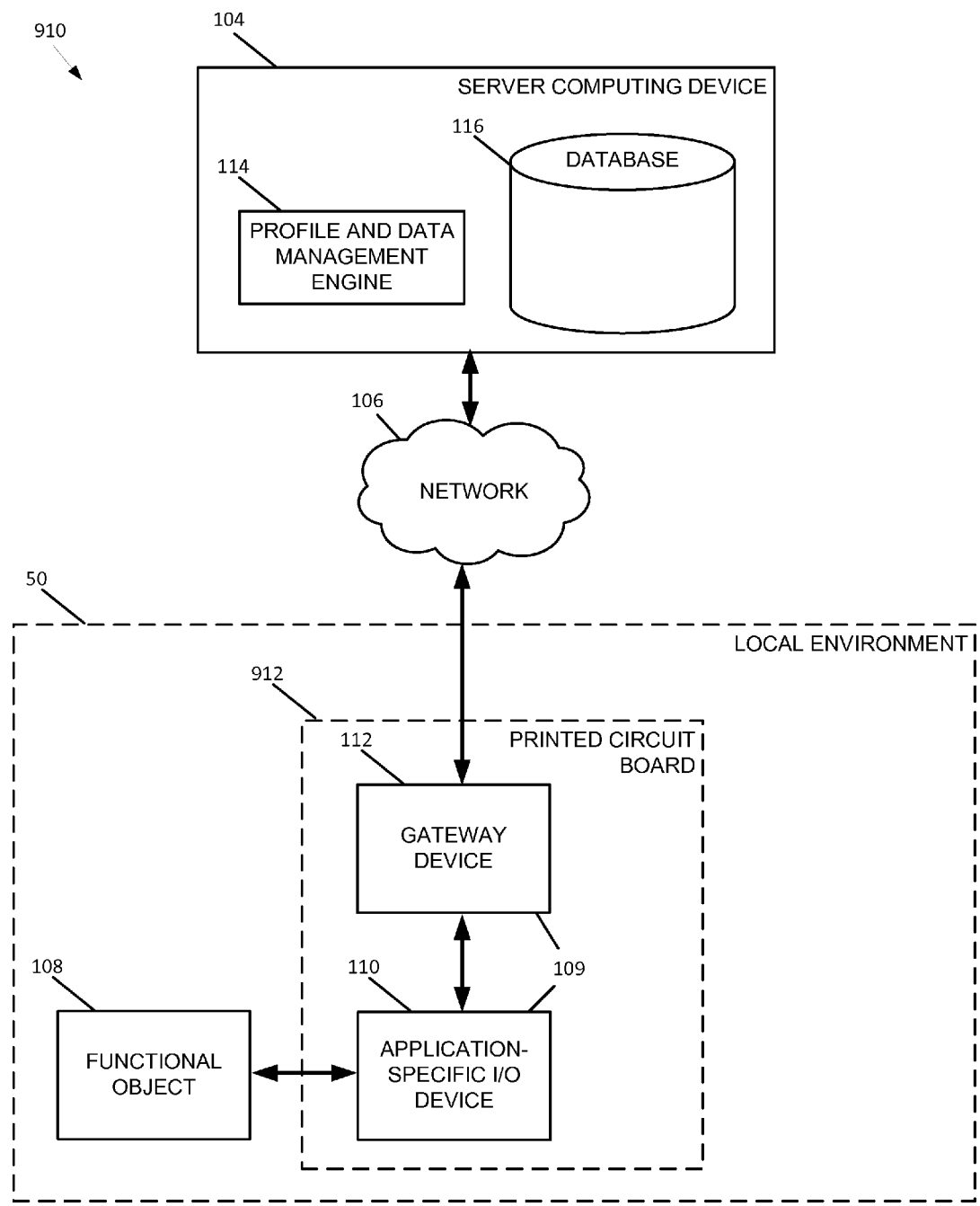
FIG. 19 illustrates another exemplary embodiment of a system for managing profiles and data for a functional object.

FIG. 19 illustrates another exemplary embodiment of a system 910 for managing profiles and data for a functional object 108. The system 810 includes a printed circuit board 912, the functional object 108, the server computing device 104, and the network 106. Also shown is the local environment 50.

The printed circuit board 912 is a device that physically supports and electronically joins electronic components. The printed circuit board 912 includes the gateway device 112 and the application-specific I/O device 110. In at least some embodiments, the gateway device 112 and the application-specific I/O device 110 are electronically connected by a conductive track of the printed circuit board 912. In at least some embodiments, the printed circuit board 912 includes other component devices 109 as well.

Figure 20:
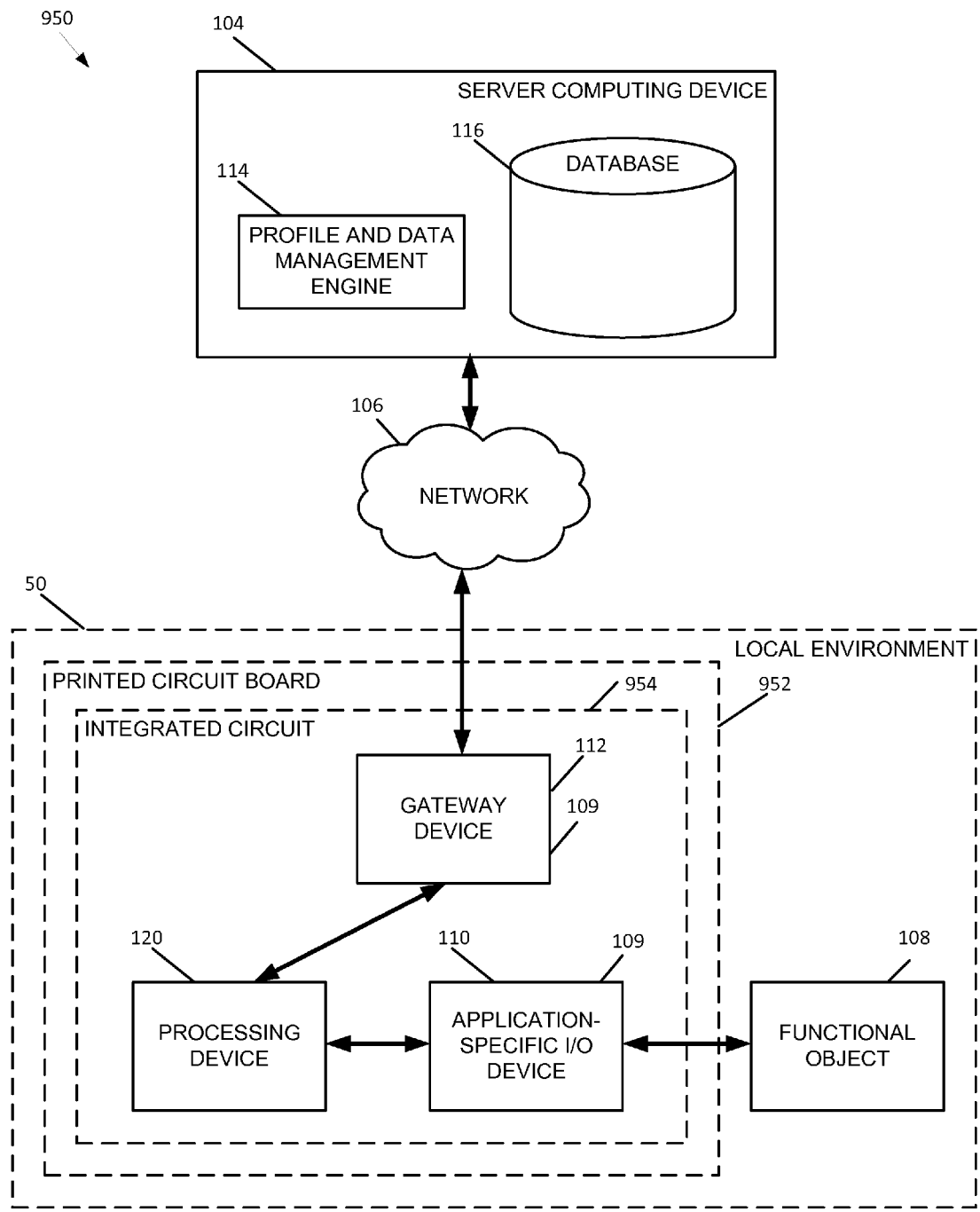
FIG. 20 illustrates another exemplary embodiment of a system for managing profiles and data for a functional object.

FIG. 20 illustrates another exemplary embodiment of a system 950 for managing profiles and data for a functional object 108. The system 950 includes a printed circuit board 952, the functional object 108, the server computing device 104, and the network 106. Also shown is the local environment 50.

The printed circuit board 952 is a device that physically supports and electronically joins electronic components. The printed circuit board 912 includes an integrated circuit 954. The integrated circuit 954 is an electronic device that includes a plurality of electronic circuits and is formed from a semiconductor material. The integrated circuit 954 includes the gateway device 112, the application-specific I/O device 110, and the processing device 120. In at least some embodiments, one or both of the printed circuit board 912 and the integrated circuit 954 include other component devices 109 as well.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A network-connected object for performing a function and communicating with a server computing device via a network, the network-connected object comprising:
  a functional object, the functional object being configured to perform a function;
  an application-specific input/output (I/O) device, comprising:
    an electronic circuit configured to perform an application-specific function related to the functional object; and
  a gateway device, comprising:
    a first communication device configured for data communication with the application-specific I/O device;
    a second communication device configured for data communication with the server computing device;
    at least one processing device that is configured to control the gateway device; and
    at least one computer readable data storage device storing instructions that, when executed by the at least one processing device, cause the gateway device to:
      receive using the first communication device an activation command from the application-specific I/O device, the activation command including a device identifier;

transmit using the second communication device the activation command to the server computing device;

receive using the second communication device a response to the activation command from the server computing device; and transmit using the first communication device the profile identifier to the application-specific I/O device.

2. The network-connected object of claim 1, wherein the response includes a client identification key for the application-specific I/O device; and the at least one computer readable data storage device storing instructions that, when executed by the at least one processing device, further cause the gateway device to:

store the client identification key; and store an association between the client identification key and a profile identifier.

3. The network-connected object of claim 2, wherein the client identification key associates the application-specific I/O device with a profile on the server computing device.

4. The network-connected object of claim 2, wherein the at least one computer readable data storage device storing instructions that, when executed by the at least one processing device, further cause the gateway device to:

transmit using the first communication device the client identification key to the application-specific I/O device.

5. The network-connected object of claim 1, wherein the gateway device assigns the profile identifier.

6. The network-connected object of claim 1, wherein the application-specific I/O device specifies the profile identifier, and the activation command includes the profile identifier.

7. The network-connected object of claim 1, wherein the first communication device uses at least one of Universal Asynchronous Receiver/Transmitter (UART), Inter-Integrated Circuit (I2C) communication technology, and Serial Peripheral Interface (SPI) bus for data communication with the application-specific I/O device.

8. The network-connected object of claim 1, wherein the second communication device uses Internet Protocol (IP) for communication with the server computing device.

9. The network-connected object of claim 1, wherein the second communication device uses at least one of Transmission Control Protocol/Internet Protocol (TCP/IP), User Datagram Protocol (UDP), and Constrained Application Protocol (CoAP) for communication with the server computing device.

10. The network-connected object of claim 1, wherein the application-specific function determines a status of the functional object.

11. The network-connected object of claim 1, wherein the application-specific function controls the functional object.

12. The network-connected object of claim 1, wherein the application-specific function measures a parameter of the functional object.

13. The network-connected object of claim 1, further comprising a battery device.

14. The network-connected object of claim 1, further comprising a local communication device configured for data communication with a second network-connected object.

15. The network-connected object of claim 14, wherein the local communication device uses mesh networking to communication with the second network-connected object.

16. The network-connected object of claim 1, wherein the device identifier comprises values associated with the vendor, model, and serial number of the application-specific I/O device.

17. The network-connected object of claim 1, wherein the gateway device uses at least one of wired or wireless technology for data communication with the server computing device.

18. The network-connected object of claim 1, wherein the application-specific I/O device is a resource-constrained device.

* * * * *